(12) United States Patent
Meen et al.

(10) Patent No.: US 11,216,165 B2
(45) Date of Patent: Jan. 4, 2022

(54) CONTENT PROCESSING METHOD AND ELECTRONIC DEVICE FOR SUPPORTING SAME

(71) Applicant: Samsung Electronics Co., Ltd., Suwon-si (KR)

(72) Inventors: Youngjae Meen, Seoul (KR); Minkyung Lee, Seoul (KR); Hyeonju Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/643,991

(22) PCT Filed: Sep. 14, 2018

(86) PCT No.: PCT/KR2018/010818
§ 371 (c)(1),
(2) Date: Mar. 3, 2020

(87) PCT Pub. No.: WO2019/054790
PCT Pub. Date: Mar. 21, 2019

(65) Prior Publication Data
US 2021/0064221 A1    Mar. 4, 2021

(30) Foreign Application Priority Data

Sep. 15, 2017   (KR) .......................... 10-2017-0118582

(51) Int. Cl.
*G06F 3/0484*    (2013.01)
*G06T 19/00*    (2011.01)

(52) U.S. Cl.
CPC ........ *G06F 3/04842* (2013.01); *G06T 19/006* (2013.01)

(58) Field of Classification Search
CPC ...... G06F 3/04842; G06F 3/017; G06F 3/016; G06F 3/011; G06T 19/006; G11B 27/031;
(Continued)

(56) References Cited

U.S. PATENT DOCUMENTS 8,874,283 B1 * 10/2014 Cavote .................... F22B 21/00
701/2
10,145,684 B1 * 12/2018 Tofte ...................... G06Q 40/08
(Continued)

FOREIGN PATENT DOCUMENTS

KR    10-2010-0013347 A    2/2010
KR    10-2011-0022232 A    3/2011
(Continued)

*Primary Examiner* — Michael Roswell
(74) *Attorney, Agent, or Firm* — Jefferson IP Law, LLP

(57) ABSTRACT

An electronic device according to various embodiments of the present invention may comprise: a display; a communication module; a memory; and a processor electrically connected to the display, the communication module, and the memory, wherein the processor: receives, through the communication module, video data including at least one image frame and sensor data including at least one sensor value from a first external electronic device, outputs, through the display, a user interface for visually displaying the at least one sensor value; determines one of the at least one sensor value on the basis of a first user input; changes the determined sensor value on the basis of a second user input; and outputs, through the display, at least one image frame corresponding to the determined sensor value, according to the changed sensor value. Various other embodiments are possible.

13 Claims, 22 Drawing Sheets

(58) Field of Classification Search
CPC .. G11B 27/10; H04N 21/436; H04N 21/4363; H04N 21/43615; H04N 21/43637; G08C 17/02
See application file for complete search history.

(56) References Cited

U.S. PATENT DOCUMENTS

| | | |
|---|---|---|
| 10,666,941 B1* | 5/2020 | Doron ................ H04N 21/4126 |
| 2003/0071897 A1* | 4/2003 | Brett ...................... H04N 5/253 |
| | | 348/97 |
| 2011/0275957 A1* | 11/2011 | Bhandari ............... A61B 34/20 |
| | | 600/595 |
| 2012/0069131 A1* | 3/2012 | Abelow ............... G06Q 10/067 |
| | | 348/14.01 |
| 2015/0015730 A1 | 1/2015 | Choi et al. |
| 2015/0193983 A1 | 7/2015 | Katz et al. |
| 2016/0227105 A1* | 8/2016 | Kobayashi ......... H04N 5/23293 |
| 2016/0327950 A1 | 11/2016 | Bachrach et al. |
| 2016/0328979 A1* | 11/2016 | Postrel .................... H04W 4/46 |
| 2017/0010611 A1* | 1/2017 | Tao .......................... G09B 9/12 |
| 2017/0048451 A1 | 2/2017 | Fu et al. |
| 2018/0129224 A1 | 5/2018 | Hur |

FOREIGN PATENT DOCUMENTS

| | | |
|---|---|---|
| KR | 10-2015-0008801 A | 1/2015 |
| KR | 10-2015-0113490 A | 10/2015 |
| KR | 10-2016-0131720 A | 11/2016 |
| KR | 10-2017-0029404 A | 3/2017 |
| KR | 10-1739485 B1 | 5/2017 |

* cited by examiner

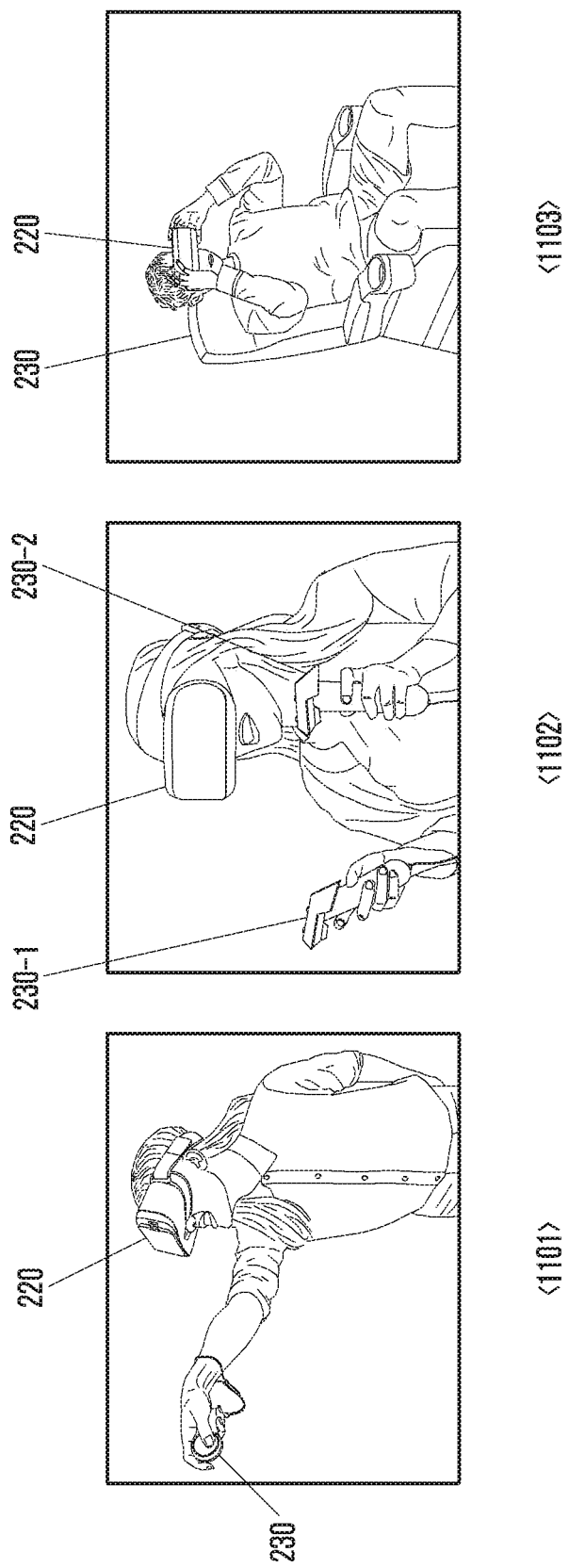

⟨1301⟩  ⟨1302⟩

FIG. 15B
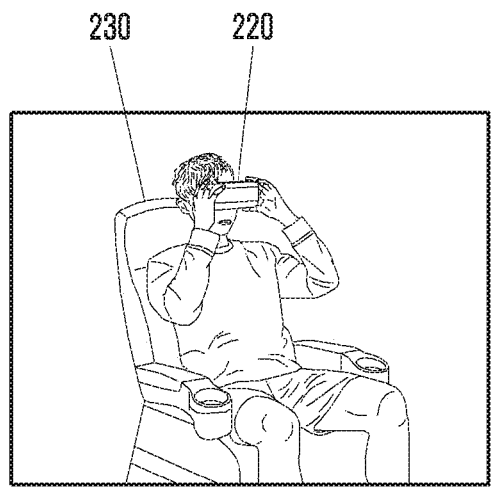
⟨1501⟩
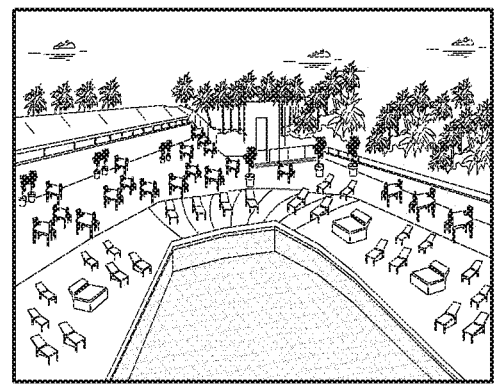
⟨1502⟩

CONTENT PROCESSING METHOD AND ELECTRONIC DEVICE FOR SUPPORTING SAME

TECHNICAL FIELD

Various embodiments of the disclosure relate to a content processing method and an electronic device supporting the same, and for example, to an electronic device and a method thereof capable of changing sensor values included in sensor data through a user interface and outputting image frames included in video data based on the changed sensor values.

BACKGROUND ART

With the development of technology, various electronic devices, such as personal digital assistant (PDA), electronic notebook, smart phone, and tablet personal computer (PC), have been released. Recently, as virtual reality (VR) technology has been actively developed, a user who uses an electronic device to which the virtual reality technology is applied can gain spatial and temporal experiences being similar to reality. Further, in accordance with the release of an electronic device including a camera capable of capturing 360 degree images including images in front and in the rear of the electronic device, a user may be provided with virtual reality content including panoramic images expressing the whole three-dimensional (3D) space.

DISCLOSURE OF INVENTION

Technical Problem

Virtual reality content being recently produced includes not only an image that is transferred to a user through user's vision but also content that is transferred to the user through other senses such as a tactual sense (hereinafter, "other content"). For example, if a user who wears a head mounted display (HMD) device holds in his/her hand an external electronic device including a motor that transfers mechanical vibrations, the user can feel the vibrations corresponding to an image, being viewed by the user through the HMD device, through the external electronic device. In general, the virtual reality content including the image and the other content has been produced in a manner that a producer identifies the image and directly determines configuration values (e.g., vibration intensity and the like) of data included in the other content corresponding to the image.

However, in the case where the producer directly determines the configuration values of the data included in the other content, the production term of the virtual reality content may be lengthened, the manufacturing cost may be increased, and the accuracy of the configuration values corresponding to the image may be lowered. Further, the user of the virtual reality content experiences only the other content in accordance with the configuration values configured by the producer, and if the user repeatedly experiences the same virtual reality content, the user may lose his/her interest therein.

Solution to Problem

According to various embodiments of the disclosure, a method for processing content of an electronic device may include receiving video data including at least one image frame and sensor data including at least one sensor value from a first external electronic device through a communication module; outputting a user interface visually displaying the at least one sensor value through a display; determining any one of the at least one sensor value based on a first user input; changing the determined sensor value based on a second user input; and outputting the at least one image frame corresponding to the selected sensor value in accordance with the changed sensor value through the display.

According to various embodiments of the disclosure, an electronic device may include a display; a communication module; a memory; and a processor electrically connected to the display, the communication module, and the memory, wherein the processor is configured to: receive video data including at least one image frame and sensor data including at least one sensor value from a first external electronic device through the communication module, output a user interface visually displaying the at least one sensor value through a display, determine any one of the at least one sensor value based on a first user input, change the determined sensor value based on a second user input, and output the at least one image frame corresponding to the selected sensor value in accordance with the changed sensor value through the display.

According to various embodiments of the disclosure, a computer readable recording medium storing instructions configured to cause at least one processor of an electronic device to perform at least one operation if the instructions are executed by the at least one processor, wherein the at least one operation comprises receiving video data including at least one image frame and sensor data including at least one sensor value from a first external electronic device through a communication module of the electronic device; outputting a user interface visually displaying the at least one sensor value through a display of the electronic device; determining any one of the at least one sensor value based on a first user input; changing the determined sensor value based on a second user input; and outputting the at least one image frame corresponding to the selected sensor value in accordance with the changed sensor value through the display.

Advantageous Effects of Invention

According to the various embodiments of the disclosure, it is possible to provide a user with a user interface for changing configuration values of data included in other content.

According to the various embodiments, it is possible to provide more accurate content to a user by extracting data corresponding to an external electronic device connected to communicate with an electronic device among data included in other content and transmitting the extracted data to the external electronic device.

BRIEF DESCRIPTION OF DRAWINGS

FIG. 11 is a diagram illustrating examples of an electronic device and an external electronic device according to various embodiments of the disclosure.

FIGS. 15A and 15B are diagrams illustrating an example of content being provided through an electronic device and an external electronic device according to various embodiments of the disclosure.

MODE FOR THE INVENTION

Figure 1:
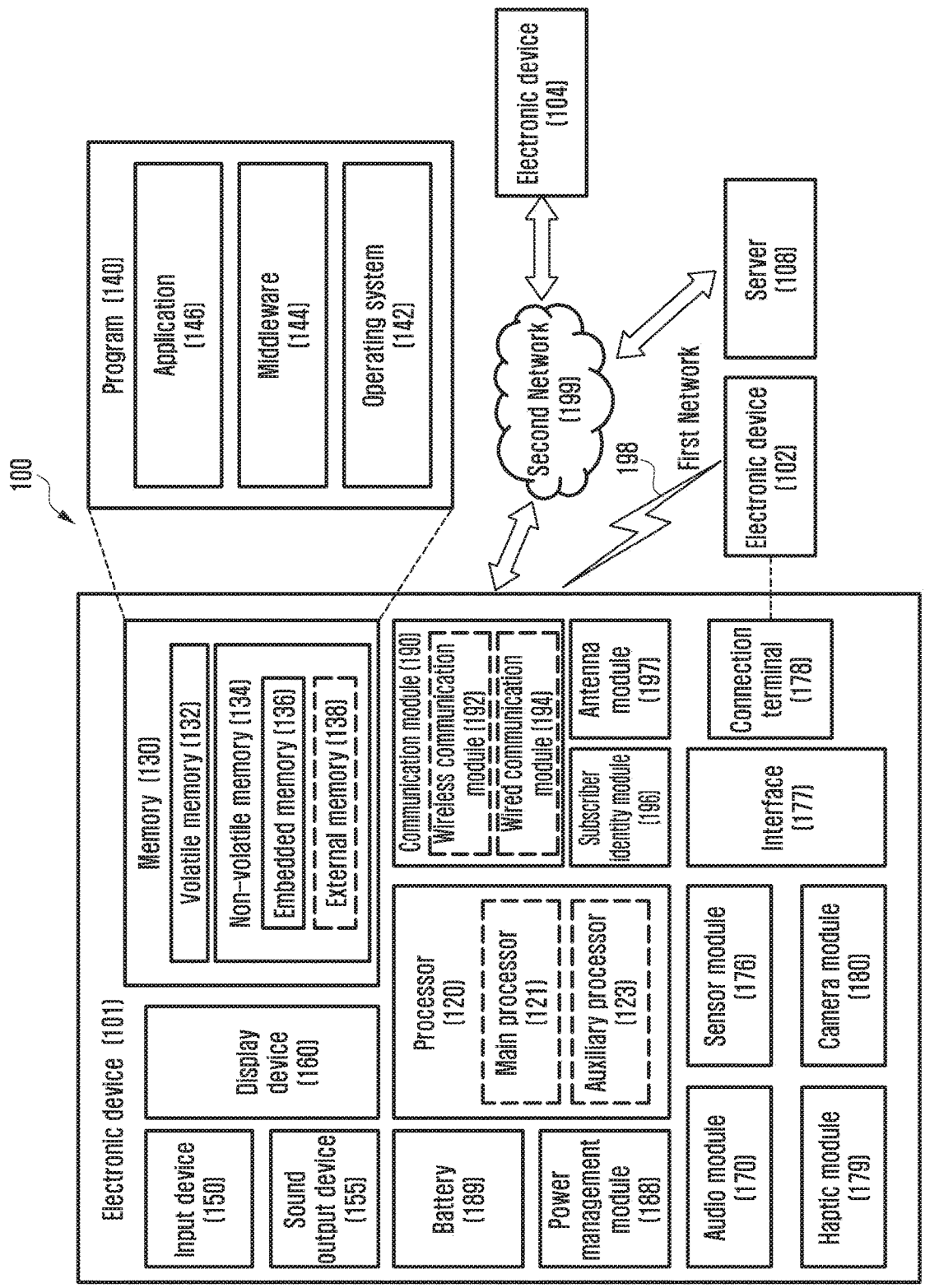
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network, using subscriber information stored in the subscriber identification module 196.

The antenna module 197 may include one or more antenna to transmit or receive a signal or power to or from the outside (e.g., the external electronic device) of the electronic device 101. According to an embodiment, the communication module 190 (e.g., the wireless communication module 192) may transmit or receive a signal to or from the external electronic device through the antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
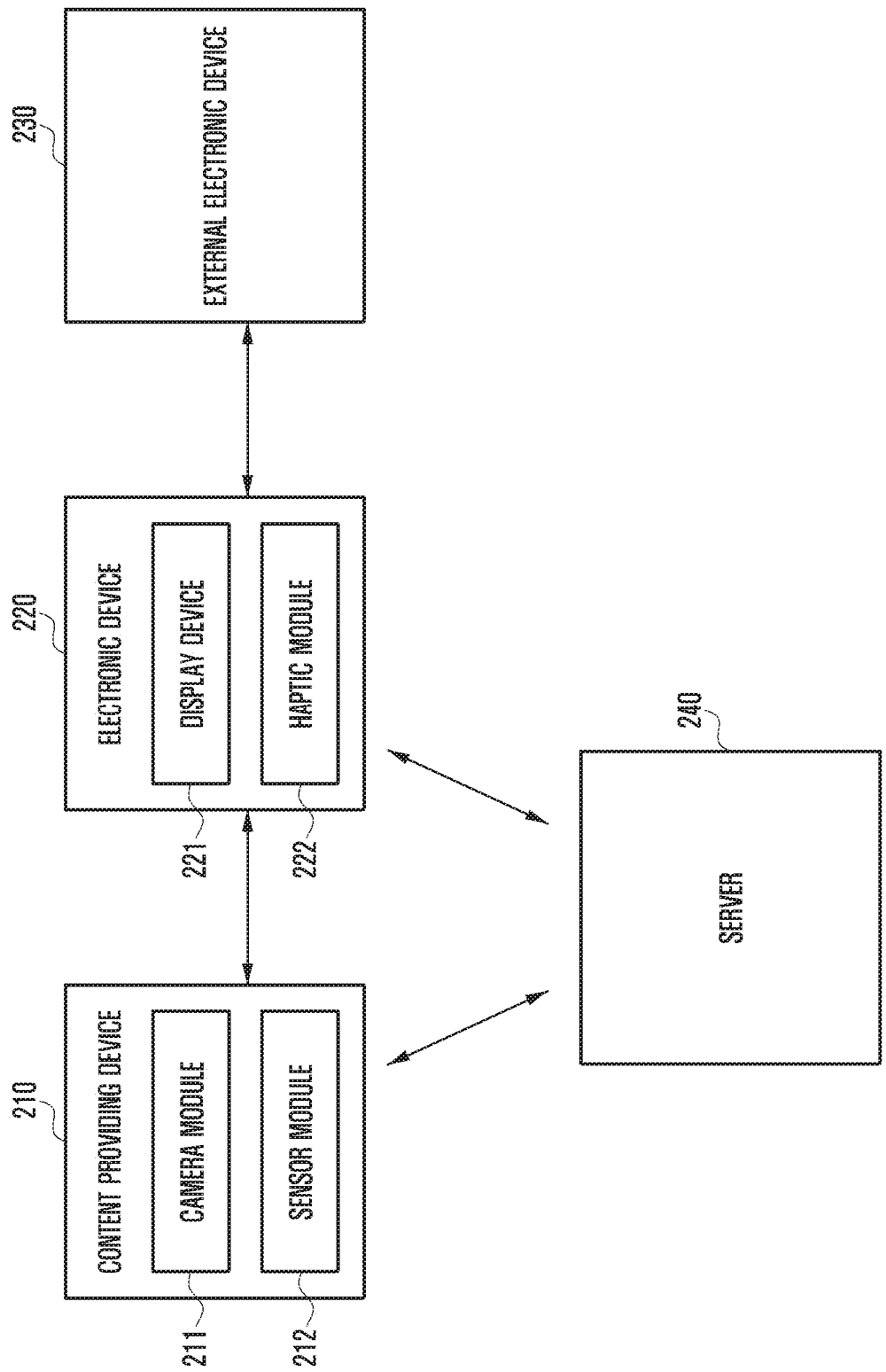
FIG. 2 is a block diagram explaining a content processing system according to various embodiments of the disclosure.

FIG. 2 is a block diagram explaining a content processing system according to various embodiments of the disclosure.

According to various embodiments, a content processing system may include a content providing device 210 and an electronic device 220, and it may further include at least one of an external electronic device 230 and a server 240. According to various embodiments, the content providing device 210, the electronic device 220, the external electronic device 230, and the server 240 may include the whole or a part of the electronic device 101 as illustrated in FIG. 1.

According to various embodiments, the content providing device 210 may include a camera module 211 (e.g., camera module 180) and a sensor module 212 (e.g., sensor module 176).

According to various embodiments, the content providing device 210 may acquire image frames of an object through the camera module 211. Here, the camera module 211 may capture, for example, 360 degree images including images in front and in the rear of the content providing device 210. For example, the content providing device 210 may create video data including at least one image frame acquired through the camera module 211. On the other hand, the video data may include, for example, data for the time for acquiring the at least one image frame. For example, the content providing device 210 may acquire the image frames through the camera module 211 simultaneously with the reception of audio through an input device (not illustrated) (e.g., input device 150) and the creation of audio-related data (hereinafter, "audio data").

According to various embodiments, the content providing device 210 may acquire a sensor value from the sensor module 212. For example, the content providing device 210 may acquire a sensor value related to a motion of the content providing device 210 through the sensor module 212. For example, the content providing device 210 may acquire a sensor value related to an angular velocity of a motion of the content providing device 210 (hereinafter, "gyro sensor value") using a gyro sensor. Here, the gyro sensor may mean a sensor measuring how large the angle has been changed based on a reference axis for a unit time, and it may detect the rotation angle and the rotation direction. For example, as the gyro sensor, a gyroscope having three reference axes (x, y, and z axes) may be used. In this embodiment, although the sensor value that is acquired using the gyro sensor has been exemplarily described, the disclosure is not limited to the above-described exemplary embodiment, and the sensor value may be acquired using various sensors, such as an acceleration sensor and a geomagnetic sensor.

The content providing device 210 may create sensor data including at least one sensor value acquired through the sensor module 212. On the other hand, the sensor data may include, for example, data for the time for acquiring the at least one sensor value.

According to various embodiments, the content providing device 210 may synchronize the video data and the sensor data with each other. For example, the content providing device 210 may synchronize the video data and the sensor data with each other based on the data for the time for acquiring the image frame included in the video data and the data for the time for acquiring the sensor value, and it may match the image frame included in the video data and the sensor value included in the sensor data with each other so that they correspond to each other.

According to various embodiments, the content providing device 210 may transmit the video data and the sensor data to the electronic device 220 through a communication module (not illustrated) (e.g., communication module 190). According to various embodiments, the content providing device 210 may transmit the video data and the sensor data to the server 240 through the communication module. For example, the content providing device 210 may transmit the video data and the sensor data to the server 240 through the communication module in a streaming method.

According to various embodiments, the content providing device 210 may be composed of, for example, two or more devices. For example, the content providing device 210 may be composed of a first device (not illustrated) including the camera module 211 and a second device (not illustrated) including the sensor module 212, and the first device and the second device being connected to communicate with each other may transmit and receive data to and from each other. Further, at least one of the first device and the second device constituting the content providing device 210 may synchronize the video data and the sensor data with each other, which are created by the respective devices.

According to various embodiments, the electronic device 220 may receive the video data and the sensor data from the content providing device 210 through the communication module (not illustrated) (e.g., communication module 190). Meanwhile, the electronic device 220 may request the content providing device 210 to transmit the video data and the sensor data through the communication module, and it may receive the video data and the sensor data from the content providing device 210 in response to the request. For example, the electronic device 220 may receive the video data and the sensor data from the content providing device 210 through the communication module in the streaming method. Meanwhile, the electronic device 220 may request the server 240 to transmit the video data and the sensor data through the communication module, and it may receive the video data and the sensor data from the server 240 in response to the request. For example, the electronic device 220 may receive the video data and the sensor data from the server 240 through the communication module in the streaming method.

According to various embodiments, the electronic device 220 may output a user interface through a display device 221 (e.g., display device 160). For example, the electronic device 220 may output the user interface capable of visually displaying at least one sensor value included in the sensor data through the display device 221. For example, the electronic device 220 may receive a user input for selecting at least one sensor value visually displayed through the user interface through an input device (not illustrated) (e.g., input device 150), and it may identify the sensor value selected in accordance with the user input. For example, the electronic device 220 may receive the user input for changing the at least one sensor value visually displayed through the user interface through the input device, and it may change the at least one sensor value based on the user input.

According to various embodiments, the electronic device 220 may output at least one image frame included in the video data through the display device 221. Meanwhile, the electronic device 220 may output at least one image frame included in the video data as a preview image through the display device 221. For example, if a user selects at least one sensor value that is visually displayed through the user interface, at least one image frame corresponding to the sensor value selected in accordance with the user input may be output as a preview image.

Meanwhile, if at least one sensor value is changed in accordance with the user input, the electronic device 220 may output at least one image frame corresponding to the at least one sensor value that is changed in accordance with the user input in accordance with the changed sensor value. For example, if the user increases the rotation angle value on x axis that is included in the sensor value by 20°, the electronic device 220 may rotate the image frame corresponding to the sensor value by 20° in clockwise direction to output the rotated image frame.

According to various embodiments, the electronic device 220 may identify whether it is connected to communicate with an external electronic device 230 through the communication module. For example, the electronic device 220 may identify whether the external electronic device 230 that is connected to communicate with the electronic device 220 is a device related to the sensor data. For example, if the external electronic device 230 is a motor for generating mechanical vibrations, the electronic device 220 may determine that the external electronic device 230 is a device related to the sensor data. For example, if the external electronic device 230 is a speaker for outputting sound, the electronic device 220 may determine that the external electronic device 230 is not a device related to the sensor data. For example, the electronic device 220 may identify the type of the external electronic device 230, and it may request the server 240 to transmit the sensor value related to the external electronic device 230.

For example, if it is determined that the external electronic device 230 is a device related to the sensor data, the electronic device 220 may extract at least one sensor value to be transmitted to the external electronic device 230 through the communication module from the sensor data. In this case, the electronic device 220 may identify the type of the external electronic device 230, and it may extract the sensor value related to the external electronic device 230 from the sensor data. For example, if the external electronic device 230 connected to communicate with the electronic device 220 is a device capable of outputting a sensor value related to the rotation direction on three reference axes and a sensor value related to the rotation angle magnitude in all, the electronic device 220 may transmit all sensor values included in the sensor data to the external electronic device 230. Meanwhile, if the external electronic device 230 is one device including a motor for generating mechanical vibrations, the electronic device 220 may extract the sensor value related to the rotation angle magnitude from the sensor values included in the sensor data to transmit the extracted sensor value to the external electronic device 230. Meanwhile, if the external electronic device 230 is composed of two devices including a motor for generating mechanical vibrations, the electronic device 220 may extract the sensor value related to the rotation angle magnitude and the sensor value related to the rotation direction on x axis from the sensor values included in the sensor data to transmit the extracted sensor value to the external electronic device 230.

According to various embodiments, if the electronic device 220 is not connected to communicate with the external electronic device 230 through the communication module, the electronic device 220 may extract the at least one sensor value related to the electronic device 220 from the sensor data, and it may output the extracted sensor value. For example, the electronic device 220 may extract the sensor value related to the rotation angle magnitude from the sensor values included in the sensor data, and it may output the sensor value related to the rotation angle magnitude through the haptic module 222 (e.g., haptic module 179).

According to various embodiments, the server 240 may receive the video data and the sensor data from the content providing device 210 through the communication module (not illustrated) (e.g., communication module 190). Meanwhile, the server 240 may receive the video data and the sensor data from the content providing device 210 through the communication module in a streaming method.

According to various embodiments, the server 240 may receive a request for transmission of the video data and the sensor data from the electronic device 220, and it may transmit the video data and the sensor data to the electronic device 220 in response to the request for transmission. Meanwhile, the server 240 may receive a request for transmission of the sensor value related to the external electronic device 230 from the electronic device 220. In this case, the server 240 may extract the sensor value related to the external electronic device 230 from the sensor values included in the sensor data received from the content providing device 210, and it may transmit the extracted sensor value to the electronic device 220.

Figure 3:
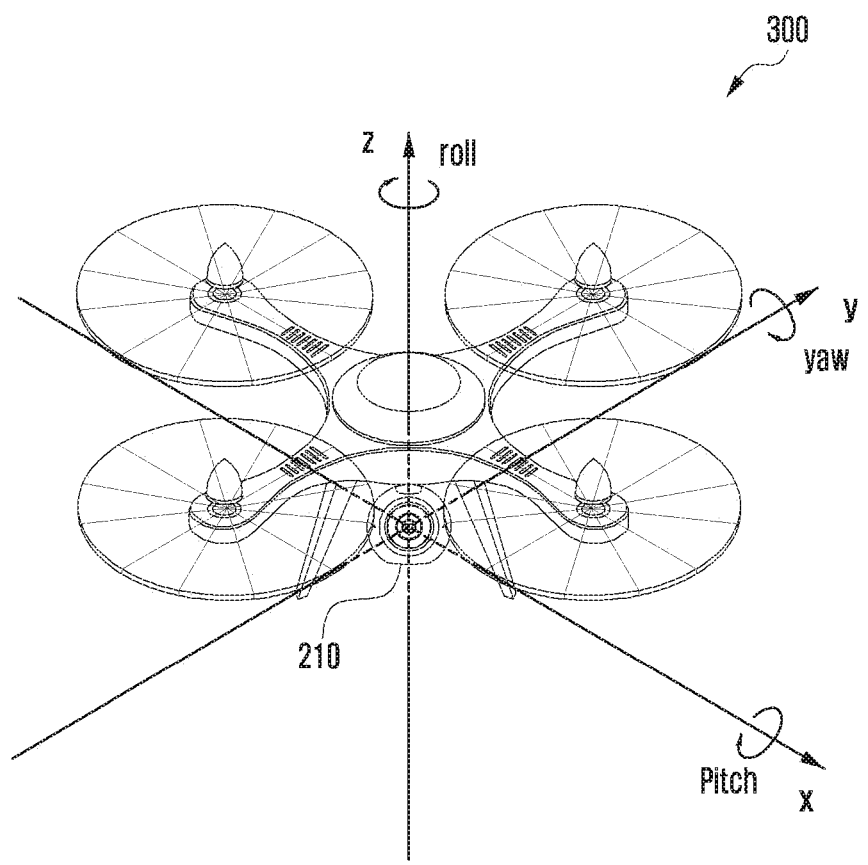
FIG. 3 is a diagram illustrating an example of a content providing device according to various embodiments of the disclosure.

FIG. 3 is a diagram illustrating an example of a content providing device according to various embodiments of the disclosure. With reference to FIG. 3, the content providing device 210 may be an electronic device that can be mounted on a drone 300 that is an unmanned aerial vehicle. For example, the content providing device 210 may be fixed to an upper end or a lower end of the drone 300, and it may acquire the image frame by capturing an image while the drone 300 is flying. For example, the content providing device 210 may acquire the sensor value for a motion (yaw, pitch, and roll) of the drone 300 based on three reference axes (x, y, and z axes) through a gyro sensor included in the sensor module 212.

Figure 4:
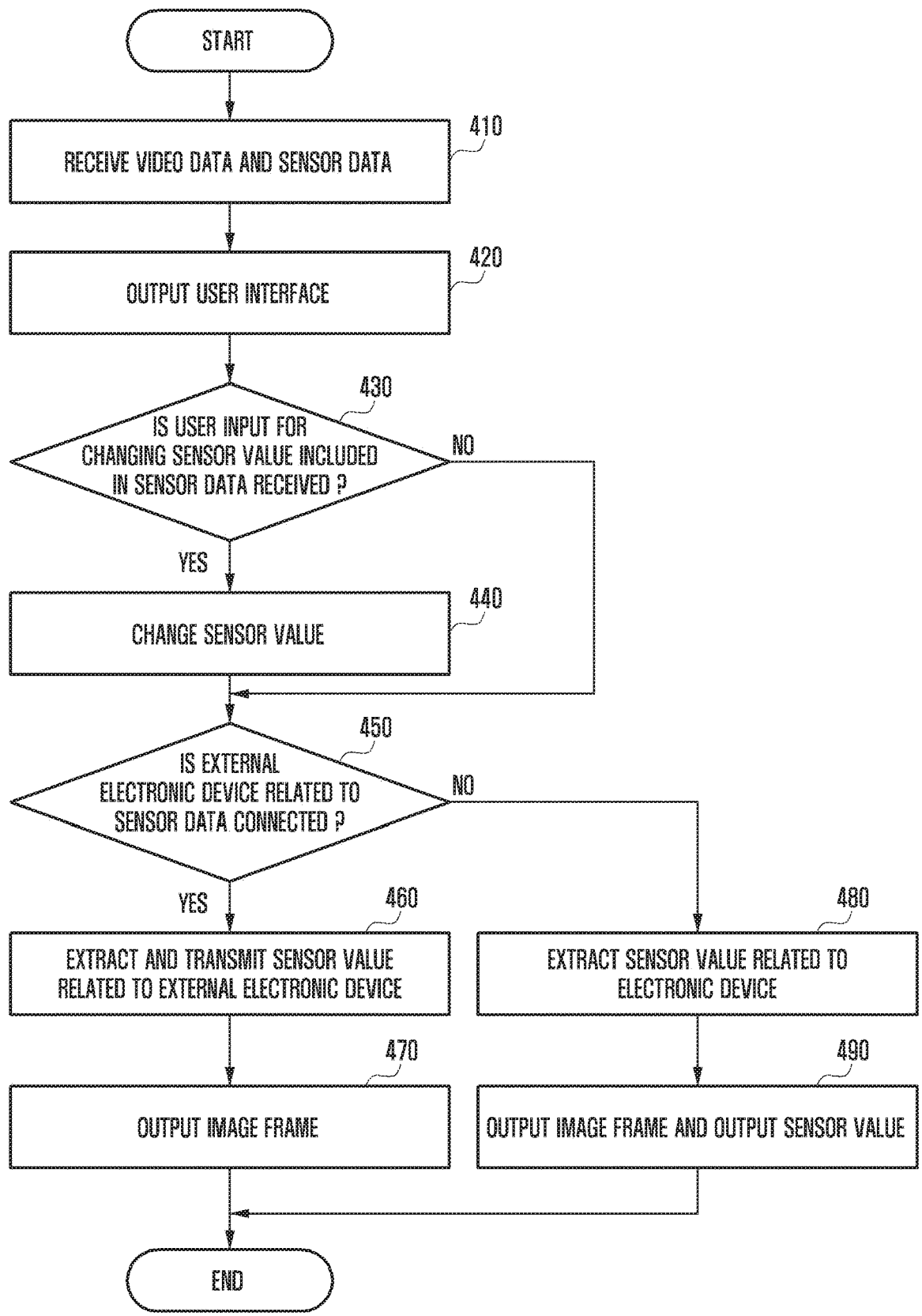
FIG. 4 is a flowchart illustrating a content processing method of an electronic device according to various embodiments of the disclosure.

FIG. 4 is a flowchart illustrating a content processing method of an electronic device according to various embodiments of the disclosure.

According to various embodiments, at operation 410, the electronic device 220 may receive video data and sensor data from at least one of the content providing device 210 and the server 240 through the communication module (e.g., communication module 190). Meanwhile, the electronic device 220 may request at least one of the content providing device 210 and the server 240 to transmit the video data and the sensor data through the communication module, and it may receive the video data and the sensor data from at least one of the content providing device 210 and the server 240 in response to the request.

According to various embodiments, at operation 420, the electronic device 220 may output a user interface through the display device 221. For example, the electronic device 220 may output the user interface capable of visually displaying at least one sensor value included in the sensor data through the display device 221. In this case, the electronic device 220 may output at least one image frame included in the video data as a preview image through the display device 221.

According to various embodiments, at operation 430, the electronic device 220 may identify whether a user input for changing any one sensor value among at least one sensor value visually displayed through the user interface is received.

According to various embodiments, if the user input for changing any one sensor value among the at least one sensor value is received, the electronic device 220, at operation 440, may change the sensor value based on the user input.

According to various embodiments, at operation 450, the electronic device 220 may identify whether it is connected to communicate with an external electronic device 230 related to the sensor data. For example, if the external electronic device 230 is a device including a motor for generating mechanical vibrations, the electronic device 220 may determine that the external electronic device 230 is a device related to the sensor data. Meanwhile, if the external electronic device 230 is a speaker for outputting sound, the electronic device 220 may determine that the external electronic device 230 is not a device related to the sensor data.

According to various embodiments, if the electronic device 220 is connected to communicate with the external electronic device 230 related to the sensor data, the electronic device 220, at operation 460, may extract at least one sensor value to be transmitted to the external electronic device 230 from the sensor data, and it may transmit the extracted at least one sensor value to the external electronic device 230. In this case, the electronic device 220 may identify the type of the external electronic device 230, and it may extract the sensor value related to the type of the external electronic device 230 from the sensor data. For example, if the external electronic device 230 connected to communicate with the electronic device 220 is a device capable of outputting the sensor value related to the rotation direction on three reference axes and the sensor value related to the rotation angle magnitude in all, the electronic device 220 may transmit all the sensor values included in the sensor data to the external electronic device 230. Meanwhile, if the external electronic device 230 is one device including a motor for generating mechanical vibrations, the electronic device 220 may extract the sensor value related to the rotation angle magnitude from the sensor values included in the sensor data to transmit the extracted sensor value to the external electronic device 230. Meanwhile, if the external electronic device 230 is composed of two devices including the motor for generating the mechanical vibrations, the electronic device 220 may extract the sensor value related to the rotation angle magnitude from the sensor values included in the sensor data and the sensor value related to the rotation direction on x axis to transmit the extracted sensor value to the external electronic device 230. In this case, the sensor value related to the rotation direction on x axis may mean the sensor value indicating the clockwise direction if the rotation angle value on x axis is larger than a reference value (e.g., 0°), and it may mean the sensor value indicating the counterclockwise direction if the rotation angle value on x axis is smaller than the reference value (e.g., 0°).

According to various embodiments, at operation 470, the electronic device 220 may output at least one image frame included in the video data through the display device 221. In this case, if the at least one sensor value is changed based on the user input at operation 440, the electronic device 220 may output the at least one image frame corresponding to the at least one sensor value, which is changed in accordance with the user input, in accordance with the changed sensor value. For example, if the user increases the rotation angle value on x axis that is included in the sensor value by 20°, the electronic device 220 may rotate the image frame corresponding to the sensor value by 20° in clockwise direction to output the rotated image frame.

According to various embodiments, if the electronic device 220 is not connected to communicate with the external electronic device 230 related to the sensor data, the electronic device 220, at operation 480, may extract the at least one sensor value related to the electronic device 220 from the sensor data. For example, if the electronic device 220 includes a haptic module 222 including a motor for generating mechanical vibrations, the electronic device 220 may extract the sensor value related to the rotation angle magnitude from the sensor values included in the sensor data.

According to various embodiments, at operation 490, the electronic device 220 may output at least one image frame included in the video data through the display device 221, and it may output the sensor value extracted from the sensor data through the haptic module 222.

Figure 5:
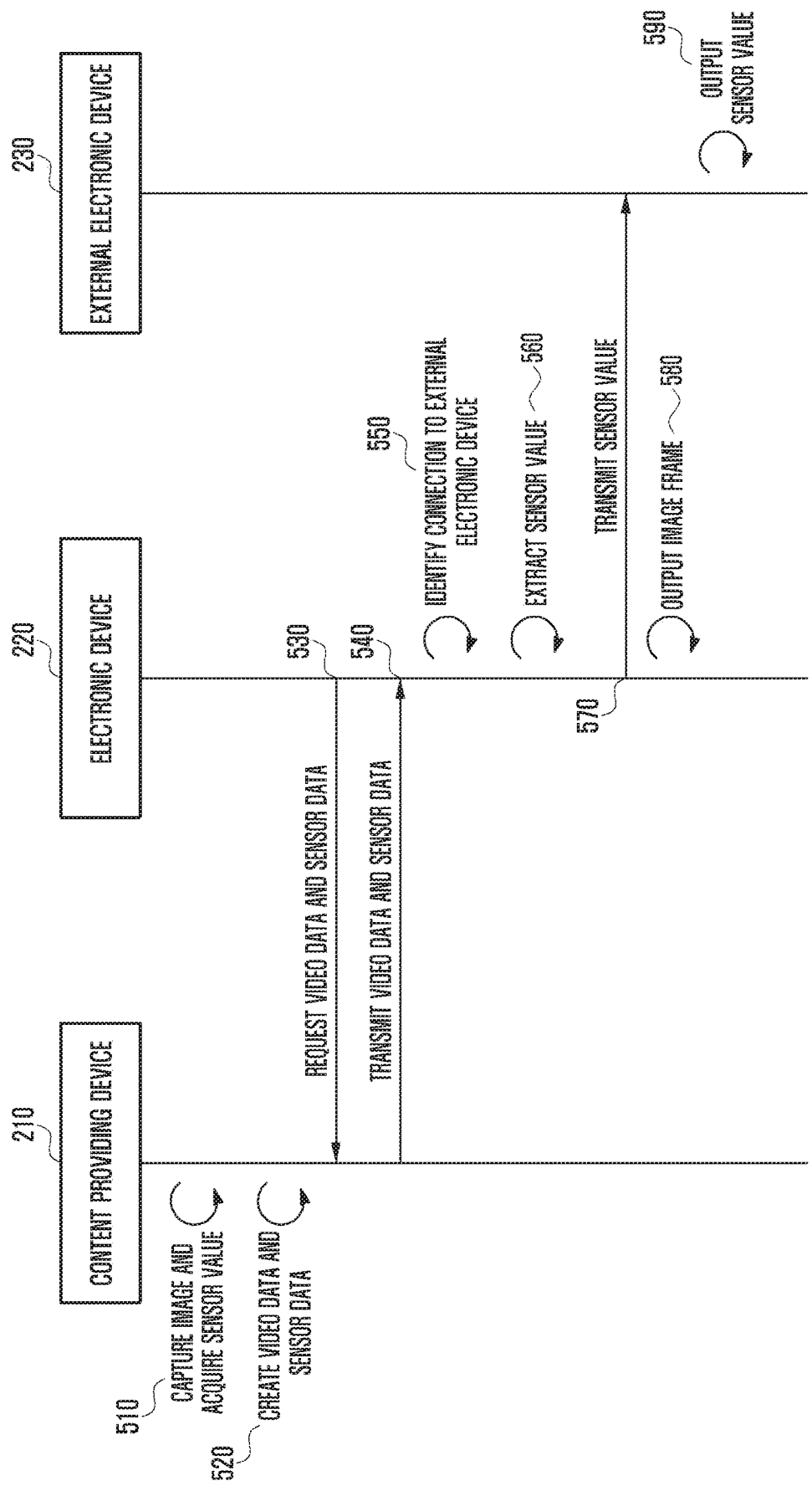
FIG. 5 is a diagram illustrating an operation for processing content performed among a content providing device, an electronic device, and an external electronic device according to various embodiments of the disclosure.

FIG. 5 is a diagram illustrating an operation for processing video data and sensor data performed among a content providing device, an electronic device, and an external electronic device according to various embodiments of the disclosure. Detailed explanation of the duplicate contents to those as described above with reference to FIG. 4 will be omitted.

According to various embodiments, at operation 510, the content providing device 210 may acquire image frames of an object through the camera module 211. Further, the content providing device 210 may acquire the sensor value related to the motion of the content providing device 210 through the sensor module 212. For example, the content providing device 210 may acquire the sensor value related to an angular velocity of the motion of the content providing device 210 using the gyro sensor.

According to various embodiments, at operation 520, the content providing device 210 may create the video data including at least one image frame acquired through the camera module 211. Further, the content providing device 210 may create the sensor data including at least one sensor value acquired through the sensor module 212.

According to various embodiments, at operation 530, the electronic device 220 may request the content providing device 210 to transmit the video data and the sensor data through the communication module (e.g., communication module 190).

According to various embodiments, at operation 540, the content providing device 210 may transmit the video data and the sensor data to the electronic device 220 through the communication module (e.g., communication module 190).

In this case, the content providing device 210 may synchronize the video data and the sensor data with each other, and it may transmit the synchronized video data and sensor data to the electronic device 220. Meanwhile, the content providing device 210 may synchronize the video data and the sensor data with each other based on the data for the time for acquiring the image frame included in the video data and the data for the time for acquiring the sensor value, and it may match the image frame included in the video data and the sensor value included in the sensor data with each other so that they correspond to each other.

According to various embodiments, at operation 550, the electronic device 220 may identify whether it is connected to communicate with the external electronic device 230 related to the sensor data.

According to various embodiments, at operation 560, if the electronic device 220 is connected to communicate with the external electronic device 230 related to the sensor data, it may extract the at least one sensor value to be transmitted to the external electronic device 230 from the sensor data. In this case, the electronic device 220 may identify the type of the external electronic device 230, and it may extract the sensor value related to the type of the external electronic device 230 from the sensor data.

According to various embodiments, at operation 570, the electronic device 220 may transmit the at least one sensor value extracted from the sensor data to the external electronic device 230.

According to various embodiments, at operation 580, the electronic device 220 may output at least one image frame included in the video data through the display device 221.

According to various embodiments, at operation 590, the external electronic device 230 may output the sensor value received from the electronic device 220. For example, if the external electronic device 230 includes the motor for generating the mechanical vibrations, it may determine the intensity of the vibrations based on the sensor value received from the electronic device 220, and it may output the sensor value by generating the mechanical vibrations in accordance with the determined intensity of the vibrations. For example, if the external electronic device 230 is composed of two devices including the motor for generating the mechanical vibrations, it may determine the sensor value related to the rotation angle magnitude to be output through the respective devices based on the sensor value related to the rotation direction on x axis.

Figure 6:
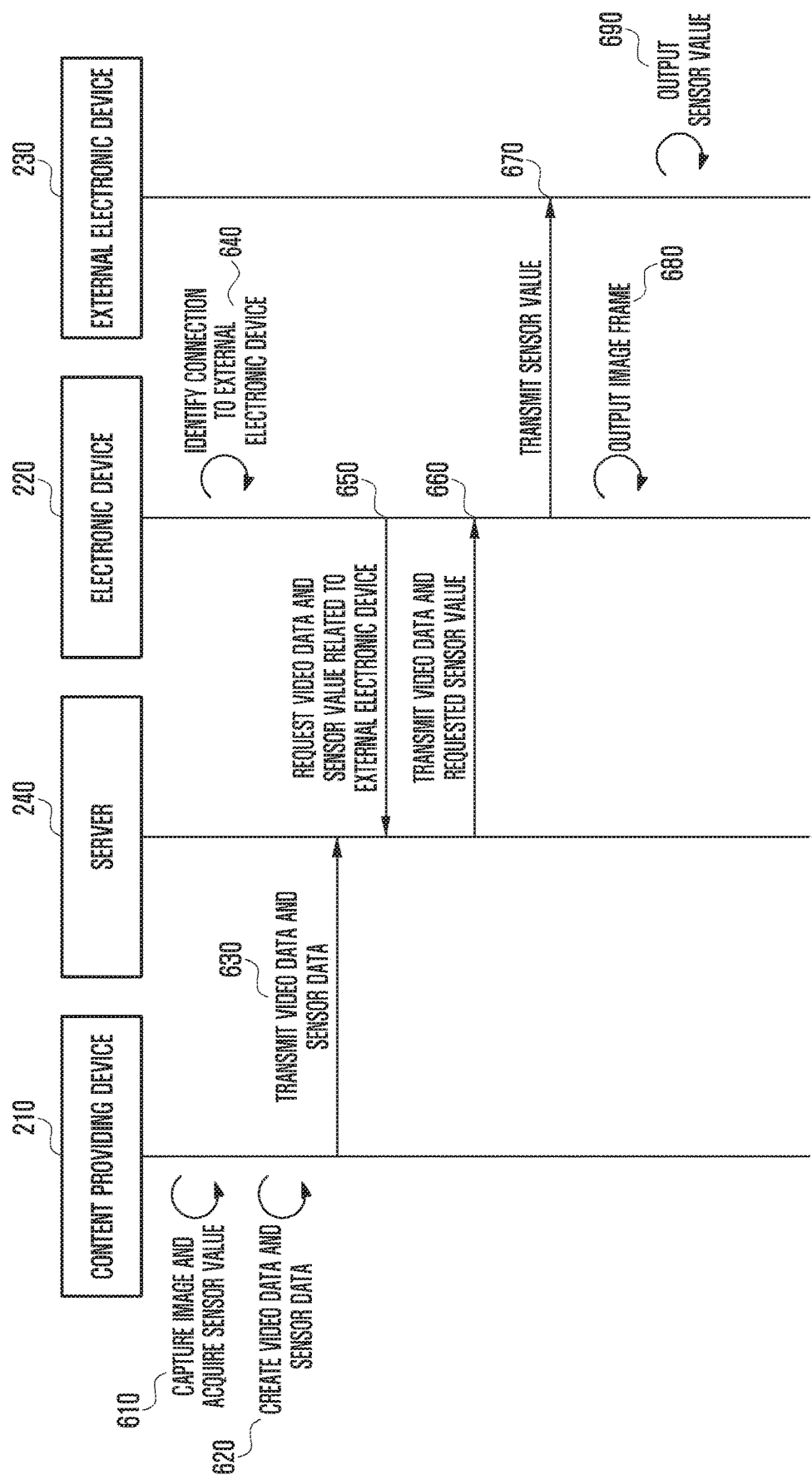
FIG. 6 is a diagram illustrating an operation for processing content performed among a content providing device, a server, an electronic device, and an external electronic device according to various embodiments of the disclosure.

FIG. 6 is a diagram illustrating an operation for processing video data and sensor data performed among a content providing device, a server, an electronic device, and an external electronic device according to various embodiments of the disclosure. Detailed explanation of the duplicate contents to those as described above with reference to FIGS. 4 and 5 will be omitted.

According to various embodiments, at operation 610, the content providing device 210 may acquire image frames of an object through the camera module 211. Further, the content providing device 210 may acquire the sensor value related to the motion of the content providing device 210 through the sensor module 212. For example, the content providing device 210 may acquire the sensor value related to an angular velocity of the motion of the content providing device 210 using the gyro sensor.

According to various embodiments, at operation 620, the content providing device 210 may create the video data including at least one image frame acquired through the camera module 211. Further, the content providing device

210 may create the sensor data including at least one sensor value acquired through the sensor module 212.

According to various embodiments, at operation 630, the content providing device 210 may transmit the video data and the sensor data to the server 240 through the communication module (e.g., communication module 190). In this case, the content providing device 210 may synchronize the video data and the sensor data with each other, and it may transmit the synchronized video data and sensor data to the server 240. Meanwhile, the content providing device 210 may synchronize the video data and the sensor data with each other based on the data for the time for acquiring the image frame included in the video data and the data for the time for acquiring the sensor value, and it may match the image frame included in the video data and the sensor value included in the sensor data with each other so that they correspond to each other.

According to various embodiments, at operation 640, the electronic device 220 may identify whether it is connected to communicate with the external electronic device 230.

According to various embodiments, at operation 650, the electronic device 220 may request the server 240 to transmit the video data and the sensor value related to the external electronic device 230 through the communication module (e.g., communication module 190). In this case, the electronic device 220 may identify the type of the external electronic device 230, and it may request transmission of the sensor value related to the type of the external electronic device 230.

According to various embodiments, at operation 660, the server 240 may transmit the at least one sensor value related to the external electronic device 230, which is extracted from the video data and the sensor data through the communication module (e.g., communication module 190), to the electronic device 220. For example, the server 240 may identify the type of the external electronic device 230, and it may extract the sensor value related to the type of the external electronic device 230 from the sensor data to transmit the extracted sensor value to the electronic device 220.

According to various embodiments, at operation 670, the electronic device 220 may transmit the sensor value related to the type of the external electronic device 230 received from the server 240 to the external electronic device 230 through the communication module.

According to various embodiments, at operation 680, the electronic device 220 may output at least one image frame included in the video data through the display device 221.

According to various embodiments, at operation 690, the external electronic device 230 may output the sensor value received from the electronic device 220.

Figure 7:
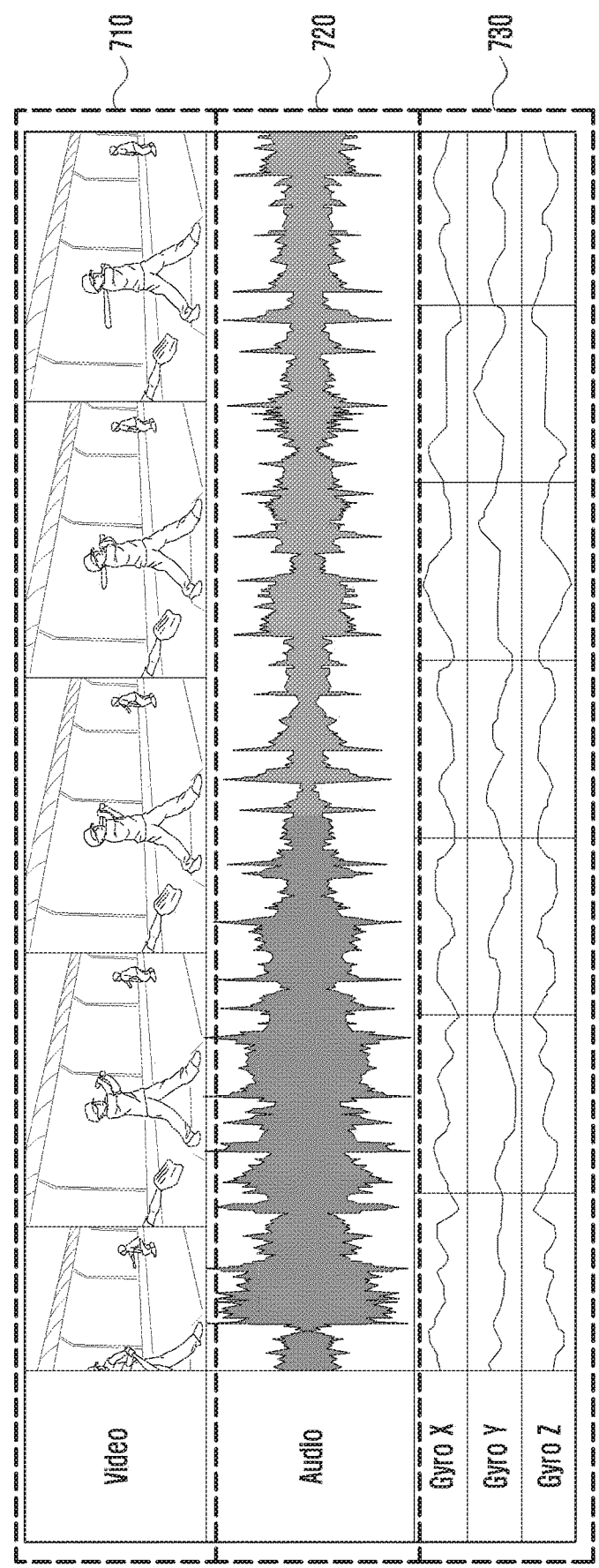
FIG. 7 is a diagram illustrating an example in which synchronized video data, audio data, and sensor data are visually displayed in accordance with time according to various embodiments of the disclosure.

FIG. 7 is a diagram illustrating an example in which synchronized video data, audio data, and sensor data are visually displayed in accordance with time according to various embodiments of the disclosure.

With reference to FIG. 7, it can be identified that image frames included in video data 710, audio included in audio data 720, and at least one sensor value included in sensor data match one another. The video data 710 may include a plurality of image frames arranged in order in accordance with the time for acquiring the image frames. The sensor data 730 may include gyro sensor values related to three reference axes (x, y, and z axes).

Figure 8:
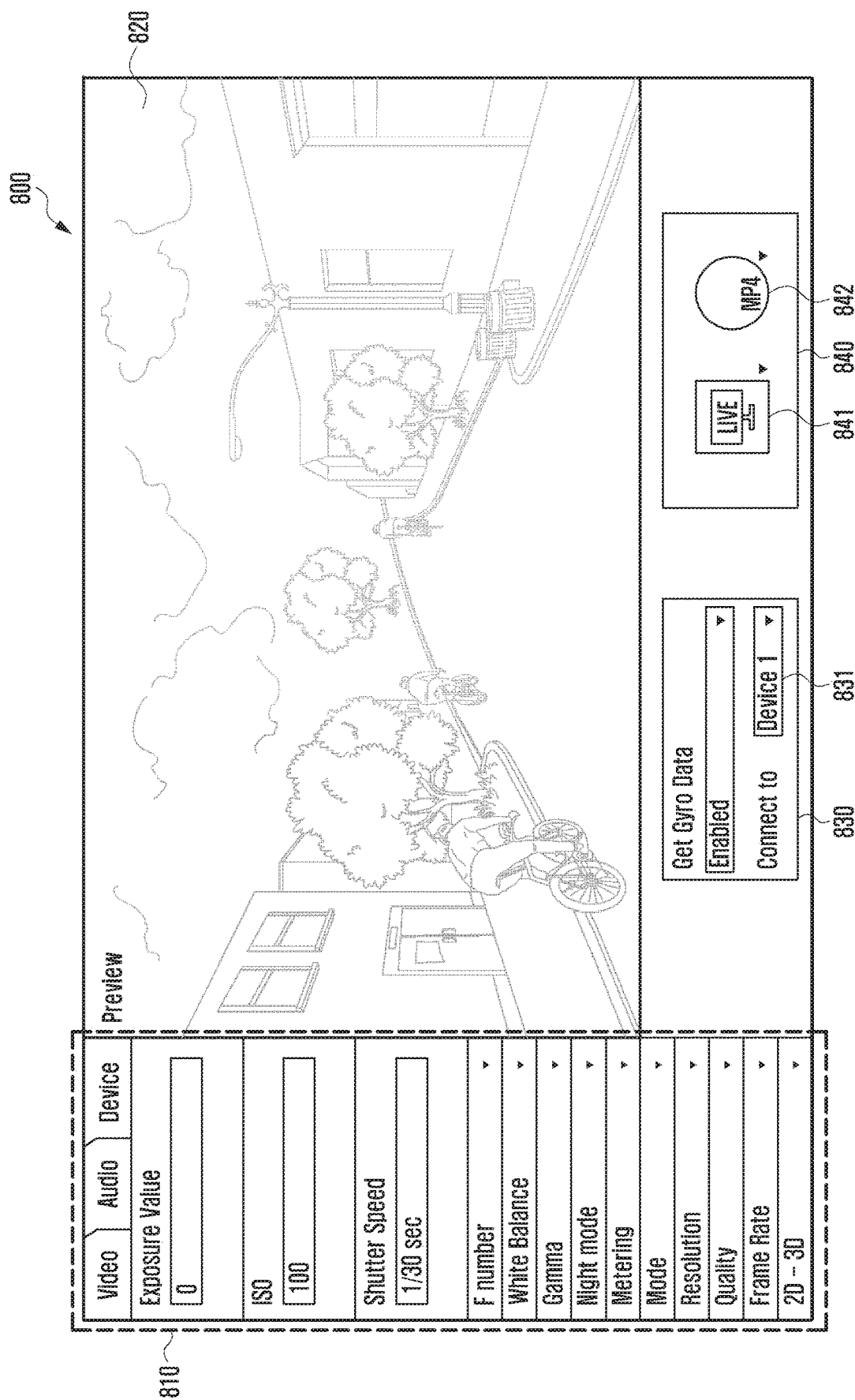
FIG. 8 is a diagram illustrating an example of a user interface being output to a display device of an electronic device according to various embodiments of the disclosure.

FIG. 8 is a diagram illustrating an example of a user interface being output to a display device of an electronic device according to various embodiments of the disclosure.

With reference to FIG. 8, the electronic device 220 may output a screen 800 on which various user interfaces are displayed through the display device (e.g., display device 160).

According to various embodiments, the electronic device 220 may output a user interface 810 for transmitting a command related to image capturing of the content providing device 210. For example, the electronic device 220 may be connected to communicate with the content providing device 210 through the communication module (e.g., communication module 190), and it may output the user interface 810 related to configuration values (e.g., exposure value and shutter speed) of the camera module 211 included in the content providing device 210. In this case, if a user selects a camera configuration value through the user interface 810, the electronic device 220 may transmit a command for changing the configuration value of the camera module 211 included in the content providing device 210 to the content providing device 210.

According to various embodiments, the electronic device 220 may output a user interface 820 for displaying at least one image frame included in the video data received from the content providing device 210 as a preview image. For example, if the video data is received from the content providing device 210 in a streaming method, the electronic device 220 may output the user interface 820 for displaying the image frame included in the video data being successively received from the content providing device 210 as a preview image.

According to various embodiments, the electronic device 220 may output a user interface 830 related to the sensor data received from the content providing device 210. For example, the electronic device 220 may output a user interface capable of identifying whether to receive the sensor data from the content providing device 210. Meanwhile, the electronic device 220 may output a user interface 831 capable of identifying whether it is connected to communicate with the external electronic device 230 related to the sensor data. In this case, if the electronic device 220 is connected to communicate with a plurality of external electronic devices, it may output a user interface providing a function whereby a user can select any one of the plurality of external electronic devices.

According to various embodiments, the electronic device 220 may output a user interface 840 related to a method for receiving the video data and the sensor data. For example, if the user selects a user interface 841 related to the streaming method, the electronic device 220 may receive the video data and the sensor data from the content providing device 210 in the streaming method. For example, if the user selects a user interface 842 related to a method for downloading the whole content including the video data and the sensor data, the electronic device 220 may download the whole video data and the whole sensor data included in the content from the content providing device 210.

Figure 9A:
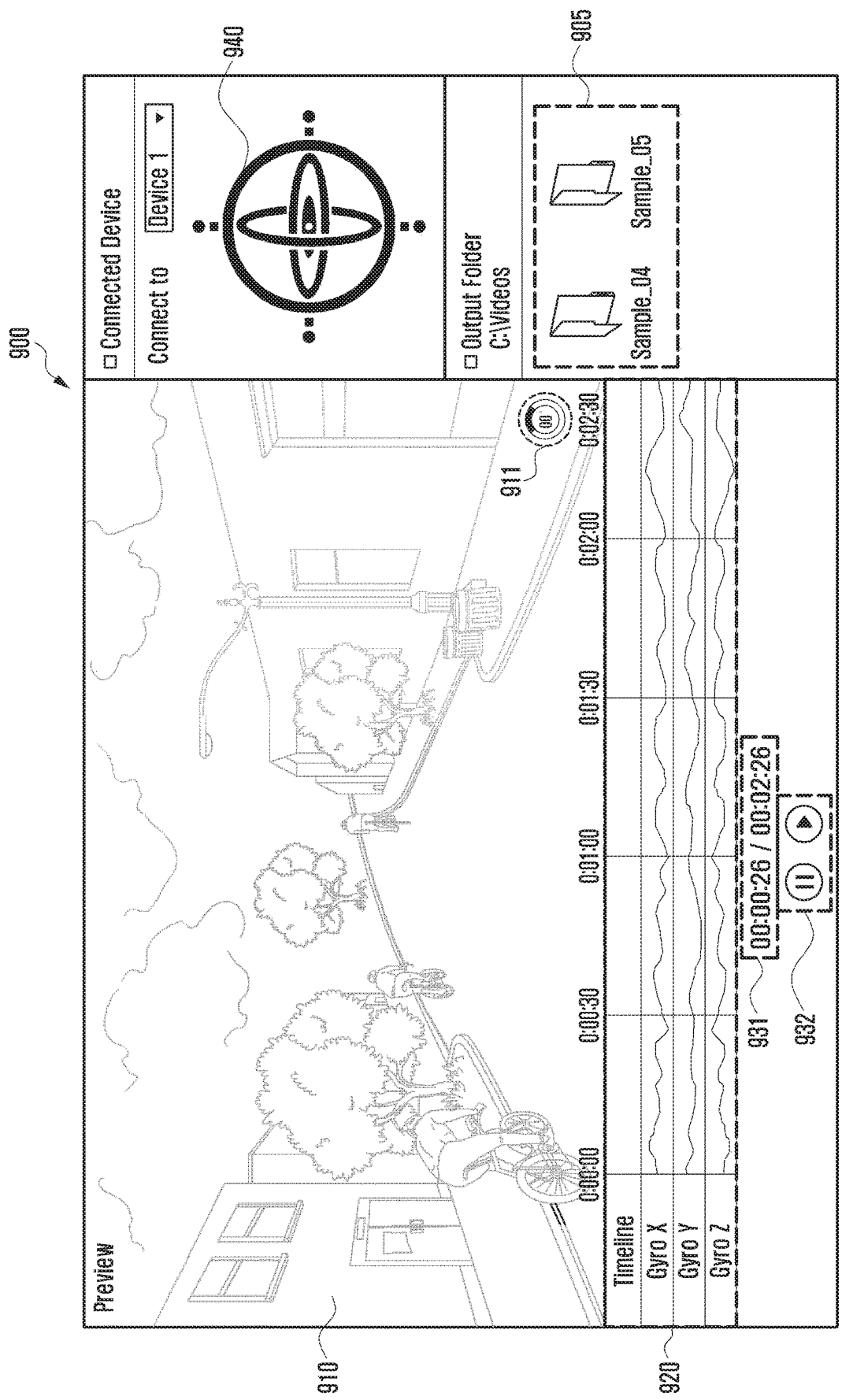
FIGS. 9A to 9C are diagrams illustrating an example in which sensor data is processed through a user interface being output to a display device of an electronic device according to various embodiments of the disclosure.
Figure 9B:
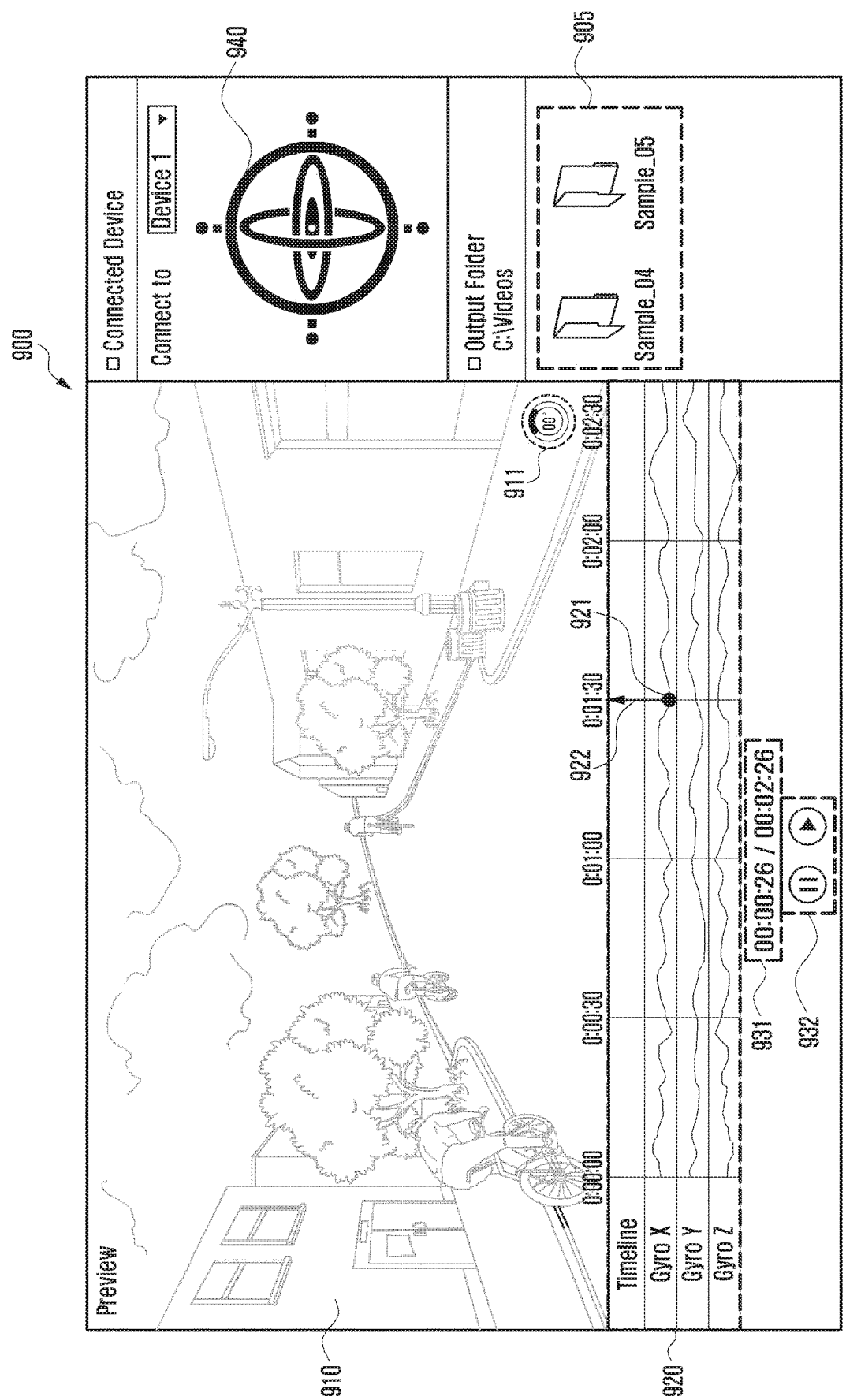
Figure 9C:
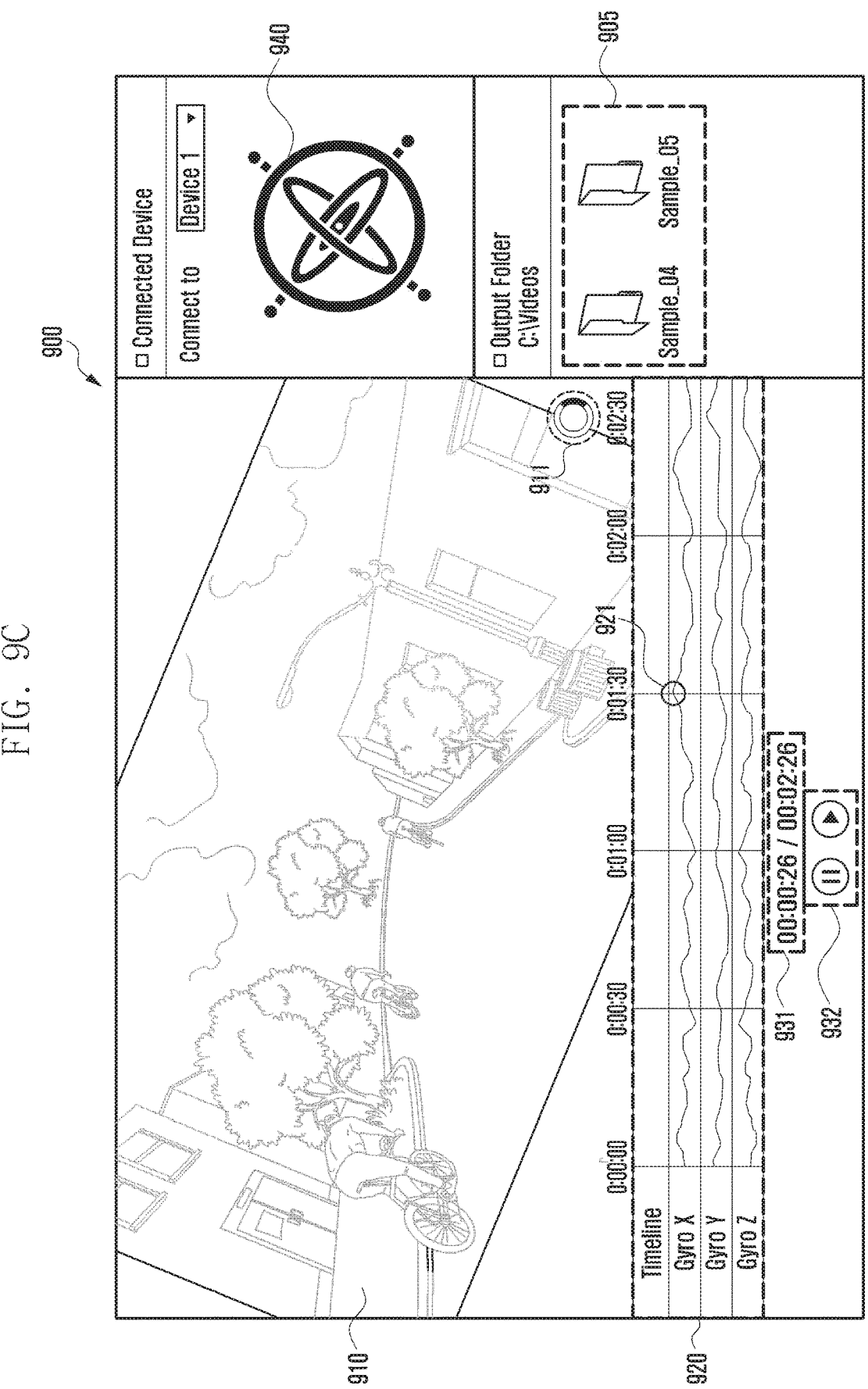

FIGS. 9A to 9C are diagrams illustrating an example in which sensor data is processed through a user interface being output to a display device of an electronic device according to various embodiments of the disclosure.

With reference to FIG. 9A, the electronic device 220 may output a screen 900 on which various user interfaces are displayed through the display device (e.g., display device 160).

For example, the electronic device 220 may output a user interface 905 on which a user can manage video data and sensor data (e.g., data deletion).

For example, the electronic device 220 may output a user interface 910 for displaying image frames included in the video data. In this case, the electronic device 220 may display an indicator 911 of a rotation angle during the screen output of the image frames being displayed on the user interface 910 for displaying the image frames.

For example, the electronic device 220 may output a user interface 920 capable of visually displaying at least one sensor value included in the sensor data. For example, the electronic device 220 may visually display the sensor value (Gyro X, Gyro Y, Gyro Z) for the motion in accordance with the time variation based on three reference axes (x, y, and z axes) included in the sensor data.

For example, the electronic device 220 may output a user interface 931 capable of displaying time values corresponding to the image frames being displayed on the user interface 910 for displaying the image frames. For example, the electronic device 220 may output a user interface 932 capable of controlling pause or playback of an image being displayed on the user interface 910 for displaying the image frames.

For example, the electronic device 220 may output a user interface 940 capable of displaying an indicator corresponding to at least one sensor value included in the sensor data. For example, the electronic device 220 may output a user interface 940 capable of visually displaying an indicator (e.g., gyroscope) rotating in accordance with the sensor value (Gyro X, Gyro Y, Gyro Z) included in the sensor data.

With reference to FIG. 9B, a user may select a Gyro X sensor value 921 corresponding to the time 0:01:30 displayed on the user interface 920 related to the sensor data, and the user may change the Gyro X sensor value 921 corresponding to the time 0:01:30 (922).

With reference to FIG. 9C, the electronic device 220 may rotate and output the image frame corresponding to the time 0:01:30 in accordance with the Gyro X sensor value 921 at the time 0:01:30 that is changed by the user. In this case, the electronic device 220 may also rotate and display the gyroscope being displayed as the indicator corresponding to the sensor value in accordance with the Gyro X sensor value 921 corresponding to the changed time 0:01:30. Meanwhile, the electronic device 220 may rotate and output the indicator 911 for the rotation angle in accordance with the rotation angle during the output of the image frame corresponding to the time 0:01:30 during the screen output of the image frame.

Figure 10A:
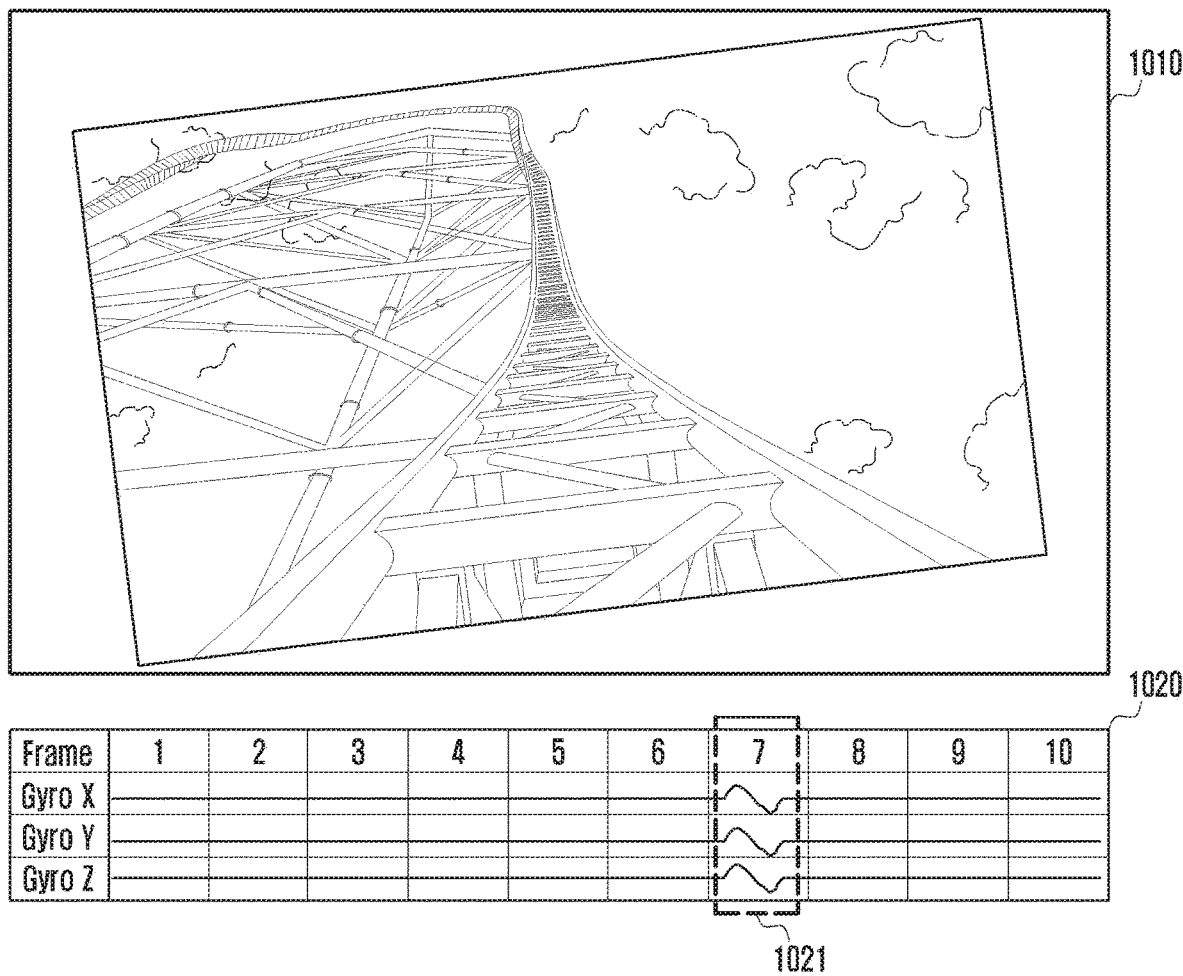
FIGS. 10A and 10B are diagrams illustrating an example of an image frame being output in accordance with a sensor value included in sensor data according to various embodiments of the disclosure.
Figure 10B:
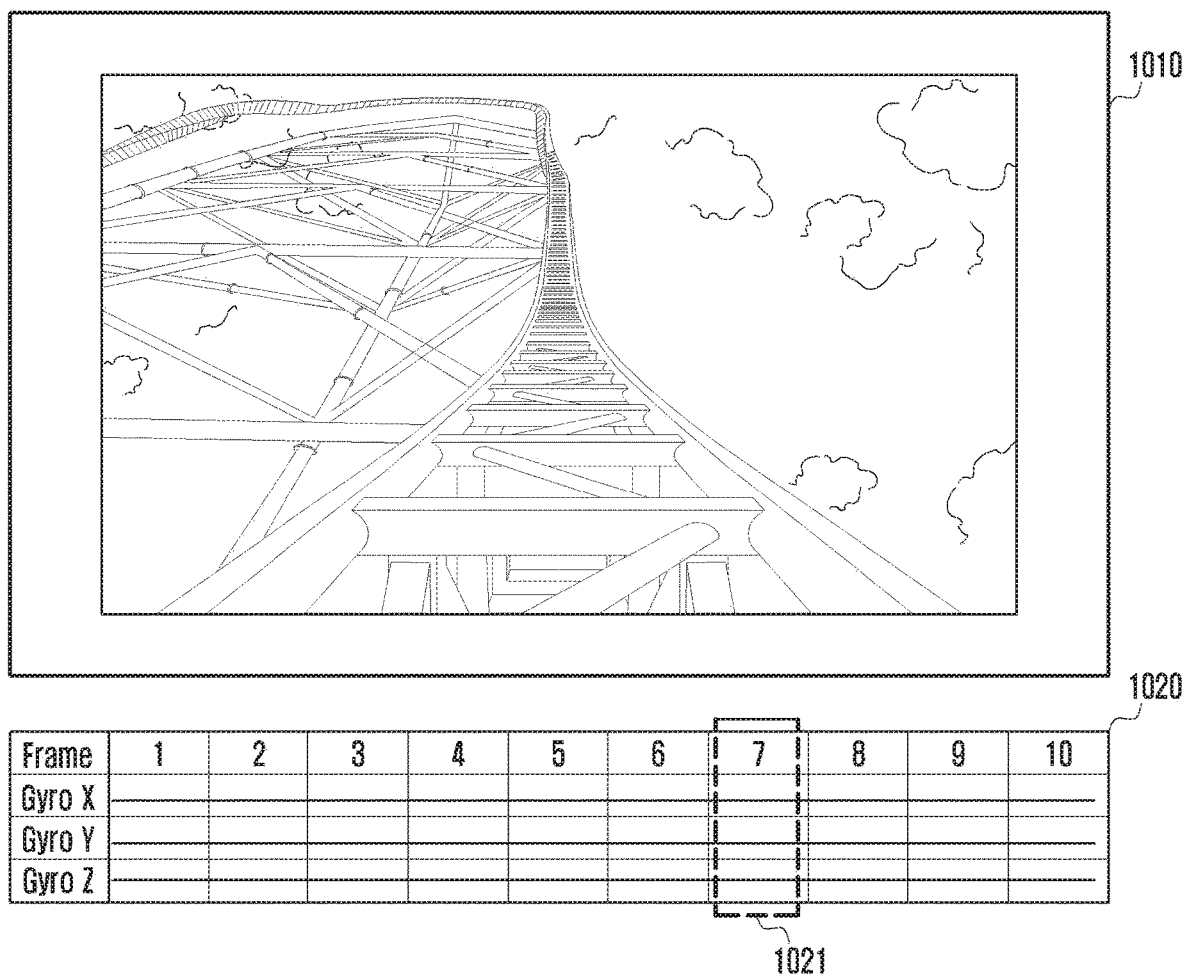

FIGS. 10A and 10B are diagrams illustrating an example of an image frame being output in accordance with a sensor value included in sensor data according to various embodiments of the disclosure.

With reference to FIG. 10A, a user can easily identify that there is a difference between sensor values 1021 corresponding to image frame number 7 and sensor values corresponding to other image frames excluding the image frame number 7 among the sensor values (Gyro X, Gyro Y, Gyro Z) of a motion through a user interface 1020 capable of visually displaying at least one sensor value included in sensor data. In this case, if the electronic device 220 outputs an image frame in accordance with the sensor value, the image frame number 7 may be rotated and outputted on a screen 1010 in contrast with other image frames.

With reference to FIG. 10B, the user may change the sensor values so that the sensor values 1021 corresponding to the image frame number 7 coincide with the sensor values corresponding to other image frames. In this case, the electronic device 220 may output the image frame number 7 on the screen 1010 in accordance with the sensor values 1021 corresponding to the changed image frame number 7.

FIG. 11 is a diagram illustrating examples of an electronic device and an external electronic device according to various embodiments of the disclosure.

With reference to the drawing reference numeral 1101 of FIG. 11, the electronic device 220 may be an HMD device capable of outputting image frames included in video data, and the external electronic device 230 may be a device including a motor that generates mechanical vibrations.

With reference to the drawing reference numeral 1102 of FIG. 11, the electronic device 220 may be an HMD device capable of outputting image frames included in video data, and the external electronic device 230 may be a device composed of two devices 230-1 and 230-2 including a motor that generates mechanical vibrations.

With reference to the drawing reference numeral 1103 of FIG. 11, the electronic device 220 may be an HMD device capable of outputting image frames included in video data, and the external electronic device 230 may be a chair-shaped electronic device capable of outputting all of sensor values related to the rotation direction on three reference axes and sensor values related to the rotation angle magnitude.

Figure 12A:
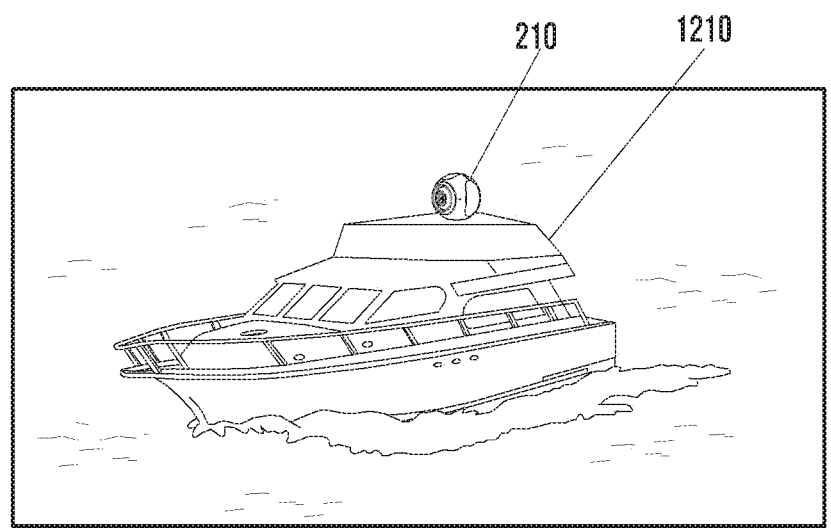
FIGS. 12A and 12B are diagrams illustrating an example of content being provided through an electronic device and an external electronic device according to various embodiments of the disclosure.
Figure 12B:
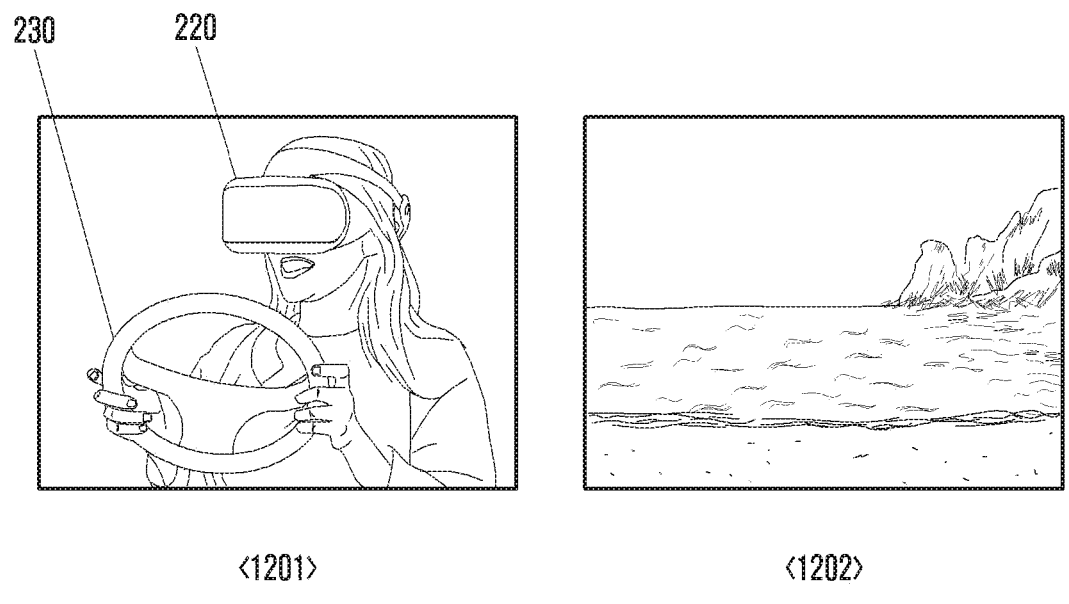

FIGS. 12A and 12B are diagrams illustrating an example of content being provided through an electronic device and an external electronic device according to various embodiments of the disclosure.

With reference to FIG. 12A, the content providing device 210 may be, for example, an electronic device that can be mounted on one area of a ship 1210. For example, the content providing device 210 may be fixed to an upper end of the ship 1210, and it may acquire image frames by capturing an image while the ship 1210 moves on water. Meanwhile, the content providing device 210 may acquire the sensor value for the motion of the ship based on three reference axes through a gyro sensor included in the sensor module 212.

With reference to the drawing reference numeral 1201 of FIG. 12B, a user can view an image moving on water through the electronic device 220 that is an HMD device. In this case, an image that is output through the electronic device 220 that is the HMD device may be a sea image as denoted by the drawing reference numeral 1202. Further, the external electronic device 230 may determine the intensity of vibrations of a motor based on the sensor value related to the rotation angle magnitude on respective reference axes among the sensor values, and the user can experience the movement of the ship more realistically by detecting the vibrations generated from the external electronic device 230.

Figure 13A:
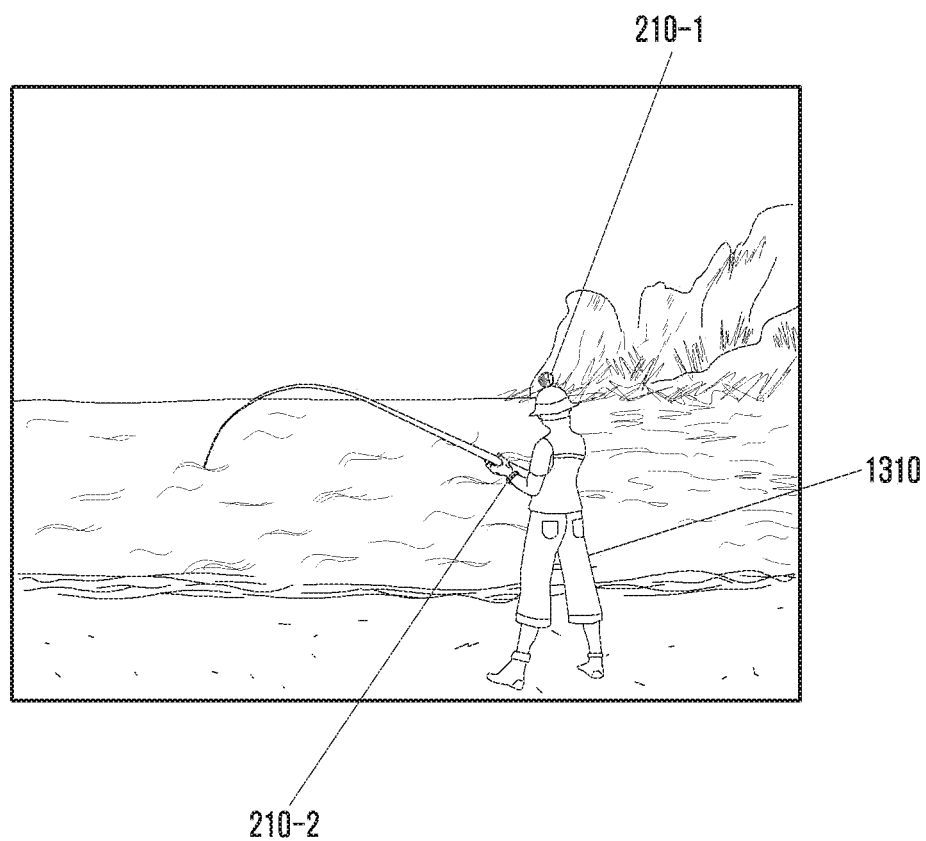
FIGS. 13A and 13B are diagrams illustrating an example of content being provided through an electronic device and an external electronic device according to various embodiments of the disclosure.
Figure 13B:
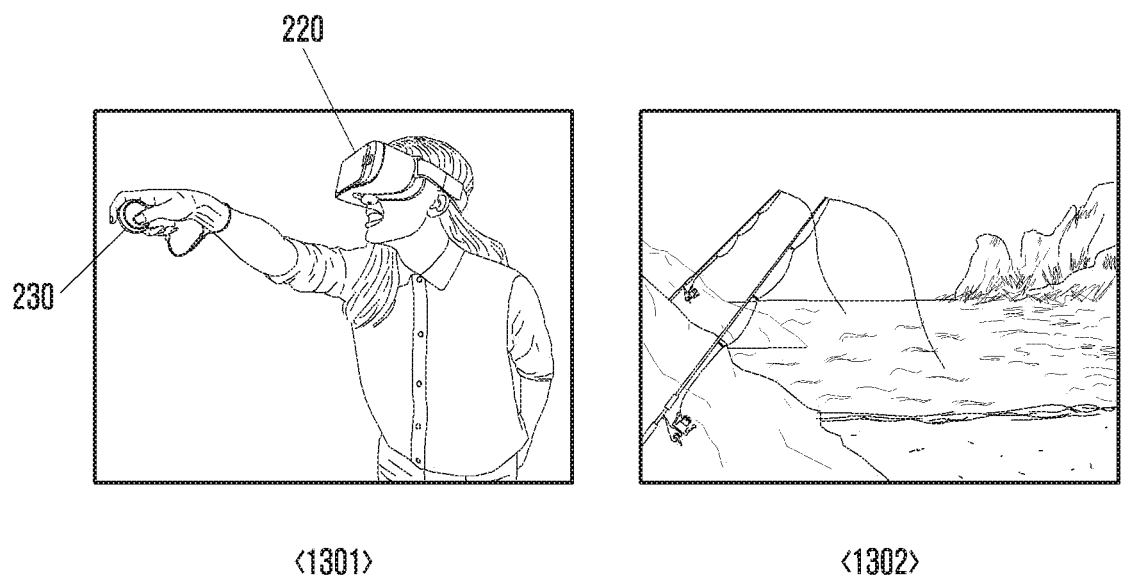

FIGS. 13A and 13B are diagrams illustrating an example of content being provided through an electronic device and an external electronic device according to various embodiments of the disclosure.

With reference to FIG. 13A, the content providing device 210 may be composed of a first device 210-1 including a camera module 211 and a second device 210-2 including a sensor module 212. For example, the first device 210-1 may be a device mountable on a hat that a person 1310 wears, and the second device 210-2 may be a wearable device that can be mounted on a person's wrist. The first device 210-1 of the content providing device 210 may acquire image frames by capturing an image while the person 1310 is fishing. The second device 210-2 of the content providing device 210 may acquire sensor values for the person's motion based on three reference axes through a gyro sensor included in the sensor module 212.

With reference to the drawing reference numeral 1301 of FIG. 13B, a user can view a fishing image through the electronic device 220 that is the HMD device. In this case, an image that is output through the electronic device 220 that is the HMD device may be a fishing place image as denoted by the drawing reference numeral 1302. Further, the external electronic device 230 may determine the intensity of vibrations of a motor based on the sensor value related to the rotation angle magnitude on respective reference axes among the sensor values, and the user can experience the motion of the person who holds a fishing rod by sensing the vibrations generated from the external electronic device 230.

Figure 14A:
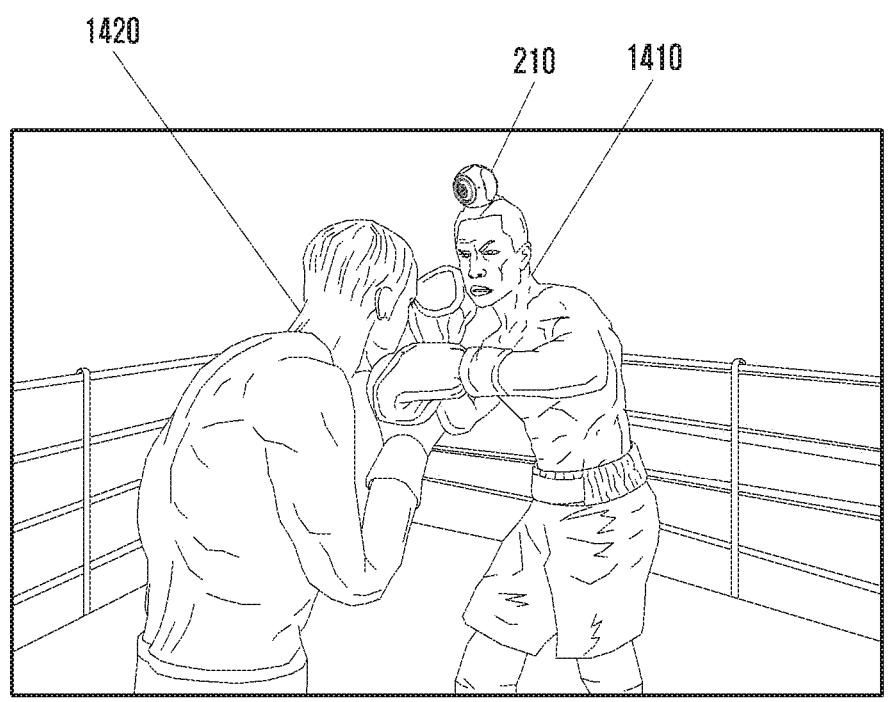
FIGS. 14A and 14B are diagrams illustrating an example of content being provided through an electronic device and an external electronic device according to various embodiments of the disclosure.
Figure 14B:
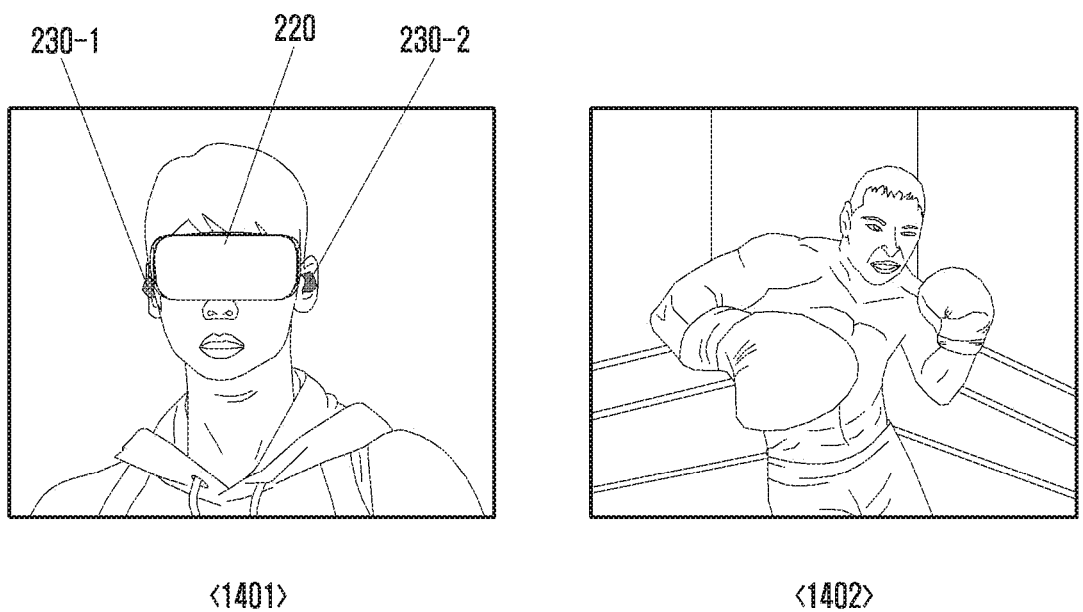

FIGS. 14A and 14B are diagrams illustrating an example of content being provided through an electronic device and an external electronic device according to various embodiments of the disclosure.

With reference to FIG. 14A, the content providing device 210 may be an electronic device that can be mounted on a body of a first boxer 1410. The content providing device 210 may be fixed to a head portion of the first boxer 1410, and it may acquire image frames by capturing an image while the first boxer 1410 is boxing with a second boxer 1420. Meanwhile, the content providing device 210 may acquire sensor values for motions of the first boxer 1410 based on three reference axes through a gyro sensor included in the sensor module 212. For example, the content providing device 210 may acquire the sensor value for the rotation of the head of the first boxer 1410 by 20° in clockwise direction on x axis and the sensor value for the rotation of the head of the first boxer 1410 by 20° in counterclockwise direction on x axis, respectively.

With reference to the drawing reference numeral 1401 of FIG. 14B, the user can view a boxing image at the time of the first boxer 1410 through the electronic device 220 that is the HMD device. In this case, the image being output through the electronic device 220 that is the HMD device may be an image from the viewpoint of viewing the second boxer 1420 as denoted by the drawing reference numeral 1402.

Meanwhile, the external electronic device related to the sensor data may be a device composed of a first external electronic device 230-1 and a second external electronic device 230-2 including a motor for generating mechanical vibrations. The first external electronic device 230-1 and the second external electronic device 230-2 may determine the intensity of the vibrations of the motor based on the sensor value related to the rotation direction on x axis and the sensor value related to the rotation angle magnitude among the sensor values. For example, the sensor value for the rotation by 20° in clockwise direction on x axis may be output through the first external electronic device 230-1, and the sensor value for the rotation by 20° in counterclockwise direction on x axis may be output through the second external electronic device 230-2.

Figure 15A:
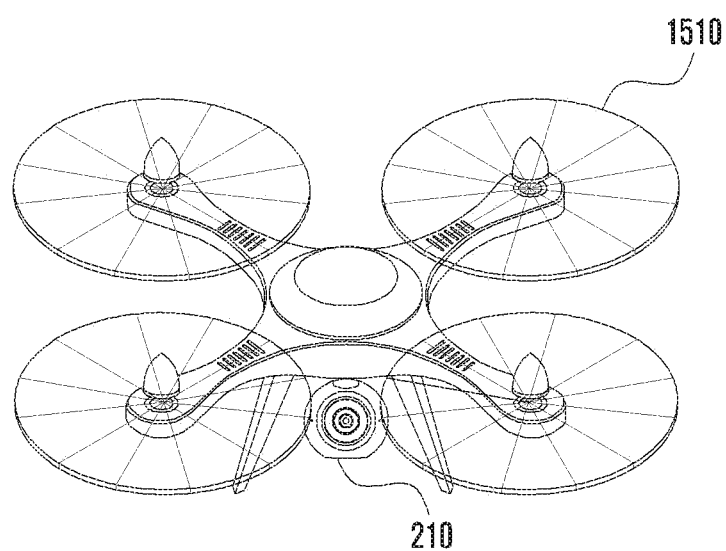

FIGS. 15A and 15B are diagrams illustrating an example of content being provided through an electronic device and an external electronic device according to various embodiments of the disclosure.

With reference to FIG. 15A, the content providing device 210 may be, for example, an electronic device that can be mounted on a drone 1510 that is an unmanned aerial vehicle. For example, the content providing device 210 may be fixed to a lower end of the drone 1510, and it may acquire image frames by capturing an image while the drone 1510 is flying. For example, the content providing device 210 may acquire the sensor value for the motion of the drone 1510 based on three reference axes through a gyro sensor included in the sensor module 212.

With reference to the drawing reference numeral 1501 of FIG. 15B, a user can view an image moving in the air through the electronic device 220 that is an HMD device. In this case, an image that is output through the electronic device 220 that is the HMD device may be an image as seen from the air to the ground as denoted by the drawing reference numeral 1502. Further, the chair-shaped external electronic device 230 may determine the motion of the chair-shaped external electronic device 230 based on the sensor value related to the rotation direction on the respective reference axes and the sensor value related to the rotation angle magnitude on the respective reference axes, and it may output the sensor values corresponding to the motion of the drone 1510.

Embodiments of the disclosure that are described in the specification and drawings are merely for easy explanation of the technical contents of the disclosure and proposal of specific examples to help understanding of the disclosure, but are not intended to limit the scope of the disclosure. Accordingly, the scope of various embodiments of the disclosure should be interpreted to include all changes or modifications derived based on the technical concept of the disclosure in addition to the embodiments disclosed herein.

The invention claimed is:

1. A method for processing content of a display device, the method comprising:
   receiving data of a video including at least one image frame and sensor data including at least one sensor value from a content providing device through a communication module;
   outputting a user interface visually displaying the at least one sensor value through a display;
   changing a sensor value related to a gyro sensor based on a user input;
   outputting the at least one sensor value included in the sensor data through a haptic module if the display device is not connected to communicate with an external electronic device;
   extracting at least one sensor value related to the external electronic device from the sensor data and transmitting the extracted at least one sensor value to the external electronic device through the communication module if the display device is connected to communicate with the external electronic device;
   in response to changing the sensor value, identifying at least one image frame to be changed based on time information corresponding to the changed sensor value;
   rotating the identified at least one image frame according to the changed sensor value; and
   outputting the video including the at least one rotated image frame corresponding to the sensor value in accordance with the changed sensor value through the display.

2. The method of claim 1, further comprising:
   identifying whether the display device is connected to communicate with the external electronic device related to the sensor data; and
   outputting, through the display, a user interface for providing a function of selecting any one of two or more external electronic devices if the display device is connected to communicate with the two or more external electronic devices.

3. The method of claim 2, further comprising requesting the content providing device to transmit the at least one sensor value related to the external electronic device if the display device is connected to communicate with the external electronic device.

4. The method of claim 1,
wherein the sensor data includes the sensor value related to the gyro sensor, and
wherein the sensor value related to the gyro sensor includes a value related to a rotation direction and a value related to a magnitude.

5. The method of claim 4,
wherein changing the sensor value based on the user input includes changing at least one of the value related to the rotation direction and the value related to the magnitude included in the sensor value related to the gyro sensor based on the user input.

6. The method of claim 1, further comprising outputting the at least one image frame included in the video data as a preview image through the display.

7. A display device comprising:
a display;
a communication module;
a memory;
a haptic module; and
a processor electrically connected to the display, the communication module, the memory, and the haptic module,
wherein the processor is configured to:
receive data of a video including at least one image frame and sensor data including at least one sensor value from a content providing device through the communication module,
output a user interface visually displaying the at least one sensor value through the display,
change a sensor value related to a gyro sensor based on a user input,
output the at least one sensor value included in the sensor data through the haptic module if the display device is not connected to communicate with an external electronic device,
extract at least one sensor value related to the external electronic device from the sensor data and transmit the extracted at least one sensor value to the external electronic device through the communication module if the display device is connected to communicate with the external electronic device,
in response to changing the sensor value, identify at least one image frame to be changed based on time information corresponding to the changed sensor value,
rotate the identified at least one image frame according to the changed sensor value, and
output the video including the at least one rotated image frame corresponding to the sensor value in accordance with the changed sensor value through the display.

8. The display device of claim 7, wherein the processor is configured to:
identify whether the display device is connected to communicate with the external electronic device related to the sensor data, and
output, through the display, a user interface for providing a function of selecting any one of two or more external electronic devices if the display device is connected to communicate with the two or more external electronic devices.

9. The display device of claim 8, wherein the processor is configured to request the content providing device to transmit the at least one sensor value related to the external electronic device if the display device is connected to communicate with the second external electronic device.

10. The display device of claim 7,
wherein the sensor data includes the sensor value related to the gyro sensor, and
wherein the sensor value related to the gyro sensor includes a value related to a rotation direction and a value related to a magnitude.

11. The display device of claim 10, wherein the processor is configured to:
change at least one of the value related to the rotation direction and the value of related to the magnitude included in the sensor value based on the user input, and
rotate and output the at least one image frame corresponding to the sensor value in accordance with the changed sensor value related to the gyro sensor based on the user input.

12. The display device of claim 7, wherein the processor is configured to output the at least one image frame included in the video data as a preview image through the display.

13. A non-transitory computer readable recording medium storing instructions configured to cause at least one processor of a display device to perform at least one operation if the instructions are executed by the at least one processor, wherein the at least one operation comprises:
receiving data of a video including at least one image frame and sensor data including at least one sensor value from a content providing device through a communication module of the display device;
outputting a user interface visually displaying the at least one sensor value through a display of the display device;
changing a sensor value related to a gyro sensor based on a user input;
outputting the at least one sensor value included in the sensor data through a haptic module if the display device is not connected to communicate with an external electronic device;
extracting at least one sensor value related to the external electronic device from the sensor data and transmitting the extracted at least one sensor value to the external electronic device through the communication module if the display device is connected to communicate with the external electronic device;
in response to changing the sensor value, identifying at least one image frame to be changed based on time information corresponding to the changed sensor value;
rotating the identified at least one image frame according to the changed sensor value; and
outputting the video data including the at least one rotated image frame corresponding to the sensor value in accordance with the changed sensor value through the display.

* * * * *